(12) United States Patent
Toth et al.

(10) Patent No.: US 10,708,827 B2
(45) Date of Patent: Jul. 7, 2020

(54) METHOD AND NODES FOR HANDLING A UE WHICH HAS MOVED FROM AN OLD LOCATION TO A NEW LOCATION

(71) Applicant: TELEFONAKTIEBOLAGET L M ERICSSON (PUBL), Stockholm (SE)

(72) Inventors: Stefan Toth, Göteborg (SE); Gunnar Rydnell, Göteborg (SE); Ann-Christine Sander, Göteborg (SE)

(73) Assignee: TELEFONAKTIEGOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/912,021

(22) PCT Filed: Jan. 14, 2016

(86) PCT No.: PCT/EP2016/050648
§ 371 (c)(1),
(2) Date: Feb. 12, 2016

(87) PCT Pub. No.: WO2017/121481
PCT Pub. Date: Jul. 20, 2017

(65) Prior Publication Data
US 2017/0257801 A1    Sep. 7, 2017

(51) Int. Cl.
*H04W 36/00* (2009.01)
*H04W 8/10* (2009.01)
(Continued)

(52) U.S. Cl.
CPC ......... *H04W 36/0033* (2013.01); *H04W 8/10* (2013.01); *H04W 64/003* (2013.01); *H04W 48/20* (2013.01); *H04W 92/14* (2013.01)

(58) Field of Classification Search
CPC . H04W 36/0033; H04W 64/003; H04W 8/10; H04W 92/14; H04W 48/20
See application file for complete search history.

(56) References Cited

U.S. PATENT DOCUMENTS 8,619,618 B2 * 12/2013 Guo ................. H04W 36/0033
370/252
9,554,350 B1 *  1/2017 Shusterman ......... H04W 60/00
(Continued)

OTHER PUBLICATIONS

3GPP TS23.401 v9.9.0 (Jun. 2011), 2011, 3GPP General Packet Radio Service (GPRS) enhancements for Evolved Universal Terrestrial Radio Access Network (E-UTRAN) access (Release 9).*
(Continued)

*Primary Examiner* — Andrew Lai
*Assistant Examiner* — Harry H Kim
(74) *Attorney, Agent, or Firm* — Rothwell, Figg, Ernst & Manbeck, P.C.

(57) ABSTRACT

The embodiments herein relate to a method performed by a mobility node for handling a UE which has moved from an old to a new location. The mobility node retrieves UE context from a database. The mobility node determines whether there is a change of mobility node and first gateway at the new location. When there is a change of the first gateway, the mobility node initiates setup of a tunnel between a second gateway and a new first gateway. When there is a change of the mobility node, the mobility node provides a subscriber server with UE context for a new mobility node at the new location. The mobility node transmits updated UE context to the database.

37 Claims, 10 Drawing Sheets

(51) Int. Cl.
*H04W 64/00* (2009.01)
*H04W 48/20* (2009.01)
*H04W 92/14* (2009.01)

(56) References Cited

U.S. PATENT DOCUMENTS

| | | | | |
|---|---|---|---|---|
| 2011/0021194 A1* | 1/2011 | Gustafsson | ........... | H04W 60/04 |
| | | | | 455/435.1 |
| 2011/0113278 A1* | 5/2011 | Yin | ..................... | H04L 12/4633 |
| | | | | 714/4.1 |
| 2011/0141884 A1* | 6/2011 | Olsson | ................. | H04W 24/04 |
| | | | | 370/225 |
| 2014/0022996 A1* | 1/2014 | Punz | ....................... | H04W 8/12 |
| | | | | 370/328 |
| 2014/0357289 A1* | 12/2014 | Smith | .................... | H04W 16/14 |
| | | | | 455/452.2 |
| 2016/0269942 A1* | 9/2016 | Olsson | ............. | H04W 36/0022 |
| 2017/0250789 A1* | 8/2017 | Zembutsu | ............. | H04W 76/10 |

OTHER PUBLICATIONS

3GPP, TS 23.401, Jun. 2011, 3GPP, V9.9.0 (Year: 2011).*
International Search Report and Written Opinion dated Nov. 21, 2016, from corresponding International Application No. PCT/EP2016/050648, 24 pages.
3GPP, "3rd Generation Partnership Project; Technical Specification Group Services and System Aspects; General Packet Radio Service (GPRS) Enhancements for Evolved Universal Terrestrial Radio Access Network (E-UTRAN) Access (Release 13)", 3GPP; 23.401 V13.5.0, 3rd Generation Partnership Project (3GPP), Mobile Competence Centre, 650, Route Des Lucioles, F-06921 Sophia-Antipolis Cedex; France, vol. SA WG2, (Dec. 15, 2015), XP051046483, 337 pages.
Ericsson: "3GPP TSG CT WG1 Meeting #48; C1-071693, CR to 24.801: Tracking area updating procedure for 3GPP access via E-UTRAN", Aug. 20-24, 2007, Vienna, Austria, XP050025903, 5 pages.

* cited by examiner

METHOD AND NODES FOR HANDLING A UE WHICH HAS MOVED FROM AN OLD LOCATION TO A NEW LOCATION

CROSS REFERENCE TO RELATED APPLICATION(S)

This application is a 35 U.S.C. § 371 National Phase Entry Application from PCT/EP2016/050648, filed Jan. 14, 2016, designating the United States, the disclosure of which is incorporated herein in its entirety by reference.

TECHNICAL FIELD

Embodiments herein relate generally to a mobility node, a method performed by the mobility node, a subscriber server, a method performed by the subscriber server. More particularly the embodiments herein relate to handling a User Equipment (UE) which has moved from an old location to a new location.

BACKGROUND

FIG. 1 shows an example of a communications system 100. The communications system 100 comprises a UE 101 which is served by a Radio Access Network (RAN) node. The RAN node is represented by Evolved Universal Terrestrial Access Network (E-UTRAN) 103 in FIG. 1. The RAN node may be for example a base station, a NodeB, an evolved NodeB (eNode B, eNB), Radio Network Controller (RNC) or any other element capable to communicate with a UE 101. The reference point between the UE 101 and the E-UTRAN 103 may be referred to as Long Term Evolution-Uu (LTE-Uu).

A Mobility Management Entity (MME) 105 may be connected to the E-UTRAN 103 via the reference point S1-MME. The MME 105 is an element having functions such as e.g. Non-Access Stratum (NAS) signalling, Inter Core Network (CN) node signalling for mobility between Third Generation Partnerhip Project (3GPP) access networks, UE reachability, Tracking Area (TA) list management, Packet data network Gateway (PGW, PDN GW) and Serving GateWay (SGW) selection, MME selection for handover with MME change etc. S10 is the reference point between a plurality of MMEs 105 for MME relocation and MME to MME information transfer. The MME 105 manages and stores UE context information (for idle state: UE/user identities, UE mobility state, user security parameters etc.).

The Home Subscriber Server (HSS) 108 is a subscriber server node similar to the Global System for Mobile Communications (GSM) Home Location Register (HLR) and Authentication Centre (AuC). The HSS 108 comprises subscriber-related information (subscriber profiles), performs authentication and authorization of the user, and may provide information about the subscriber's location and IP information. The reference point S6a enables transfer of subscription and authentication data for authenticating/authorizing user access to the evolved system between the MME 105 and the HSS 108.

Two gateways are seen in FIG. 1, i.e. the SGW 110 and the PGW 118. The SGW 110 and the PGW 118 may be implemented in one physical node or in separate physical nodes. The SGW 110 is the gateway which terminates the interface towards E-UTRAN 103. The reference point between the SGW 110 and the E-UTRAN 103 for the per bearer user plane tunneling and inter eNodeB path switching during handover may be referred to as S1-U. The SGW 110 routes and forwards user data packets, while also acting as the mobility anchor for the user plane during inter-eNodeB handovers and as the anchor for mobility between LTE and other 3GPP technologies (relaying the traffic between 2G/3G systems and the PGW 118) etc. S11 is the reference point between the SGW 110 and the MME 108.

The PGW 118 is the gateway which terminates the SGi interface towards the Packet Data Network (PDN). The PDN is illustrated in FIG. 1 by the Operator's IP Services (e.g. IMS, PSS etc.) 119. IP is short for Internet Protocol, IMS is short for IP Multimedia Subsystem or IM Multimedia core network Subsystem and PSS is short for Packet Switched Streaming. If the UE 101 is accessing multiple PDNs, there may be more than one PGW 118 for that UE 101. Functions of the PGW 118 are e.g. providing connectivity from the UE 101 to external PDNs by being the point of exit and entry of traffic for the UE 101, performing policy enforcement, packet filtering for each user, charging support, lawful interception and packet screening etc. S5 is the reference point which provides user plane tunnelling and tunnel management between the SGW 110 and the PGW 118.

The SGSN 120 is responsible for the delivery of data packets from and to the UE's 101 within its geographical service area. SGSN 120 is short for Serving GPRS Support Node, where GPRS is short for General Packet Radio Services. One of the SGSN's 120 functions is to provide signaling for mobility between 2G/3G and E-UTRAN 103 3GPP access networks. 2G/3G access network are exemplified with GERAN 122 and UTRAN 125 in FIG. 1. GERAN is short for GSM EDGE Radio Access Network where EDGE is short for Enhanced Data Rates for GSM Evolution. UTRAN is short for Universal Terrestrial Radio Access Network.

Some further functions of the SGSN 120 are to handle packet routing and transfer, mobility management (attach/detach and location management), logical link management, and authentication and charging functions etc. S3 is the interface between the SGSN 120 and the MME 105. S4 is a reference point between the SGSN 120 and the SGW 110. S12 is the reference point between the SGW 110 and the UTRAN 125. In some embodiments, the SGSN 120 and the MME 105 are co-located in one node. In this text, the term MME/SGSN will refer to any one of a standalone MME 105 or a standalone SGSN 120 or a combined MME 105 and SGSN 120 node.

The Policy and Charging Rules Function (PCRF) 130 is a policy and charging control element. The PCRF 130 encompasses policy control decision and flow based charging control functionalities, it provides network control regarding the service data flow detection, gating, Quality of Service (QoS) and flow based charging etc. The PCRF 130 may be described as a functional entity which may be a standalone node or a function implemented in another node. The reference point Gx provides transfer of (QoS) policy and charging rules from the PCRF 230 to a Policy and Charging Enforcement Function (PCEF) in the PGW 118.

Rx is the reference point which resides between the PCRF 130 and the Operator's IP Services 119. The Rx reference point is used to exchange application level session information between the PCRF 130 and the Application Function (AF) (not shown).

In some embodiments, a communications system may be divided into a Radio Access Network (RAN) and a Core Network (CN). The RAN may be e.g. the E-UTRAN 103 and may comprise a RAN node such as e.g. the base station as described above. Using the exemplary embodiment in FIG. 1, the CN may comprise for example the MME 105, the SGW 110, the PGW 118, the SGSN 120, the HSS 108 and the PCRF 130. The RAN and the CN may each comprises additional entities not shown in FIG. 1. The CN may be a Packet Switched (PS) core network or a Circuit Switched (CS) core network.

It should be noted that the communication links in the communications systems seen in FIG. 1 may be of any suitable kind including either a wired or wireless link. The link may use any suitable protocol depending on type and level of layer (e.g. as indicated by the Open Systems Interconnection (OSI) model) as understood by the person skilled in the art.

Network Functions Virtualization (NFV) (also known as Virtual Network Function (VNF)) is defined by the European Telecommunications Standards Institute (ETSI) as the "principle of separating network functions from the hardware they run on by using virtual hardware abstraction". Together with Software Defined Network (SDN), NFV is a hot topic in the telecommunication technology field, and aims at providing new ways of designing, building and operating networks.

NFV is also applicable to the Evolved Packet Core (EPC). vEPC is the abbreviation used when referring to NFV applied to the EPC. vEPC is short for Virtualized Evolved Packet Core or Virtual Evolved Packet Core. vEPC involves virtualization of at least some of the native EPC components. Such virtualized components may be for example a virtualized Mobility Management Entity (vMME), virtualized SGSN (vSGSN), virtualized PGW (vPGW), virtualized Gateway GPRS Support Node (vGGSN), virtualized PCRF (vPCRF) etc. The vEPC is fully compatible with the native EPC, and many native and virtual EPC nodes may coexist in a network.

In a stateless architecture for the core network (e.g. the EPC or vEPC) the control logic will be stateless and the UE states (the UE states may be referred to as UE Context) will be saved persistently in an external database. The control logic serving the UEs will be interchangeable and it reads the UE states only at invoking and execution of well-defined procedures. Stateless may be described as there is no memory of the past and that every transaction, interaction or event is performed as if it were being done for the very first time. Stateful is the opposite of stateless and may be described as there is memory of the past and that previous transactions, interactions or events are remembered and may affect the current transaction. A stateless system does not have any records of previous interactions and each interaction request has to be handled based on information that comes with the request. A stateful system, on the contrary, keeps track of the state of interaction, for example by setting values in a storage field dedicated for this purpose.

Mobility management is a function of communications networks which are necessary for being able to track where UEs are located, allow calls, data transfer and other services to be delivered to and from the UEs. Procedures such as Tracking Area Update (TAU) and Routing Area Update (RAU) are part of the mobility management of the EPC/LTE system and GERAN/UTRAN system, respectively.

A TAU or RAU is initiated by the UE when it detects a new TA outside its current TA list, or when it detects a new Routing Area (RA). TAU involves entities such as e.g. the MME and RAU involves entities such as e.g. the SGSN.

An example of TAU procedure will now be described. FIG. 2 is a signaling diagram illustrating an example of a TAU procedure with a SGW change, based on the communications system exemplified in FIG. 1. For TAU, the UE 101 will be in IDLE mode and when passing a cell border (the cell border is also a border between TAs) and the new TA is not part of the TA list, the UE will send a TAU message to the MME. The TAU message comprises the ID of the new TA associated with the UE. The MME 105 will receive the TAU message and saves the new TA ID associated with the UE. The MEM 105 will also update other parts of the system that needs location updating e.g. the HSS 128 or the SGW 110. The RAN 103 is represented by an eNB in FIG. 2. The reference numbers with the letter a refers to an old node, i.e. a node in the old TA. The reference numbers with the letter b refers to a new node, i.e. a node in the new TA. Optional steps are indicated with dotted arrows.

The method in FIG. 2 comprises at least some of the following steps, which steps may be performed in any suitable order than described below:

Step 201
A trigger for starting the TAU procedure occurs.
Step 202
The UE 101 initiates the TAU procedure by sending, to the eNB 103, a TAU Request message.
Step 203
The eNB 101 derives or selects the new MME 105b from the parameters comprised in the TAU Request message in step 202. The eNB 103 forwards the TAU Request message together to the new MME 105b. The new MME 105b is associated with the new TA to which the UE 101 has moved.
Step 204
The new MME 105b differentiates the type of the old node, i.e. MME 105 or SGSN 120, and uses information received from the UE 101 to derive the old MME 105a or the old S4 SGSN 120a address, and sends a Context Request message to the old MME/old S4 SGSN 105a, 120a to retrieve user information.
Step 205
If the Context Request message is sent to an old MME 105a, the old MME 105a responds with a Context Response message to the new MME 105a. If the Context Request is sent to an old S4 SGSN 120a, the old S4 SGSN 120a responds with a Context Response to the new MME 105a.
Step 206
If the integrity check of TAU Request message (sent in step 202) failed, then authentication is mandatory. If the integrity check of the TAU Request message succeeded, then the authentication is optional. The authentication involves the UE 101, the new MME 105b and the HSS 108,
Step 207
The SGW 110 is relocated when the old SGW 110a cannot continue to serve the UE 101. The MME 105 (if the MME has changed then it is the new MME 105b) may also decide to relocate the SGW 110 if a new SGW 105b is expected to serve the UE 101 longer and/or with a more optimal UE 101 to PGW path, or if a new SGW 105b can be co-located with the PGW 115. If the MME 105 has changed the new MME 105b sends a Context Acknowledge message with a SGW change indication to the old MME/old S4 SGSN 105a, 120a.
Step 208
If the MME 105 has changed, the new MME 105b verifies the Evolved Packte System (EPS) bearer status received from the UE 101 with the bearer contexts received from the old MME/old S4 SGSN 105a, 120a. If the MME 105 has not changed, the MME 105 verifies EPS bearer status from the UE 101 with the bearer contexts available in the MM context. The MME 105 releases any network resources related to EPS bearers that are not active in the UE 101. If there is no bearer context at all, the MME 105 rejects the TAU Request. If the MME 105 selected a new SGW 110b, it sends a Create Session Request message per PDN connection to the selected new SGW 110b.

Step 209

The new SGW 110b informs the PGW(s) 115 about the change of for example the Radio Access Technology (RAT) type that e.g. can be used for charging, by sending the message Modify Bearer Request per PDN connection to the PGW(s) 115 concerned.

Step 210

If dynamic PCC is deployed, and RAT type information needs to be conveyed from the PGW 115 to the PCRF 130, then the PGW 115 shall send RAT type information to the PCRF 130 by means of an Internet Protocol Conectivity Access Network (IP CAN) Session Modification procedure.

Step 211

The PGW 115 updates its bearer contexts and returns a Modify Bearer Response message to the new SGW 110b.

Step 212

The new SGW 110b updates its bearer context. This allows the new SGW 110b to route bearer PDUs to the PGW 115 when received from the eNodeB 103. The new SGW 110b returns a Create Session Response message to the new MME 105b.

Step 213

If there are no subscription data in the new MME 105b for this UE 101, or for some network sharing scenario if the Public Land Mobile Network-Identity (PLMN-ID) of the Tracking Area Identity (TAI, TA ID) supplied by the eNodeB is different from that of the Globally Unique Temporary Identity (GUTI) in the UE's context, then the new MME 105b sends an Update Location Request message to the HSS 108.

Step 214

The HSS sends the message Cancel Location message to the old MME 105b with Cancellation Type set to Update Procedure.

Step 215

If a timer started in step 204 is not running, the old MME 105a removes the MM context. Otherwise, the contexts are removed when the timer expires. It also ensures that the MM context is kept in the old MME 105a for the case the UE 101 initiates another TAU procedure before completing the ongoing TAU procedure to the new MME. The old MME 105b acknowledges with the message Cancel Location Acknowledgement (Ack).

Step 216

When old S4 SGSN 120b receives the Context Acknowledge message and if the UE 101 is in Iu Connected, the old S4 SGSN 120b sends an Iu Release Command message to a RNC 135 after the timer started in step 204 has expired. This is an optional step, as indicated with the dotted arrow.

Step 217

The RNC 135 responds with an Iu Release Complete message sent to the old S4 SGSN 120b. This is an optional step, as indicated with the dotted arrow.

Step 218

The HSS 108 acknowledges the Update Location Request message from step 213 by sending an Update Location Ack message to the new MME 105b.

Step 219

If the MME 105 has changed, when a timer started in step 204 expires, the old MME/old S4 SGSN 105a, 120a releases any local MME 105 or SGSN 120 bearer resources and additionally the old MME/old S4 SGSN 105a, 120a deletes the EPS bearer resources by sending the Delete Session Request messages to the old SGW 110a if it received the SGW change indication in the Context Acknowledge message in step 207.

Step 220

The SGW 110 acknowledges the message in step 219 by sending a Delete Session Response (Cause) messages to the old MME/old S4 SGSN 105a, 120a. The SGW 110 discards any packets buffered for the UE 101.

Step 221

The new MME 105b sends a TAU Accept message to the UE 101.

Step 222

If GUTI was included in the TAU Accept message in step 221, the UE 101 acknowledges the received message by returning a TAU Complete message to the new MME 105b.

As seen in FIG. 2, the method used today for handling the TAU procedure is signaling intense. Signals are sent over the S10, S11 and S5/S8 as well as S6 interfaces. S10 is the interface between MMEs, S11 is the interface between the MME 105 and the SGW 110, S5/S8 is the interface between the SGW 110 and the PGW 118 and S6 is the interface between the MME 105 and the HSS 108.

SUMMARY

An objective of embodiments herein is therefore to obviate at least one of the above disadvantages and to provide improved mobility management in a communications system.

According to a first aspect, the object is achieved by a method performed by a mobility node for handling a UE which has moved from an old location to a new location. The mobility node retrieves UE context information from a database when the UE has moved from the old location to the new location. The UE context information comprises mobility node information for a mobility node which currently serves the UE. The mobility node determines whether there is a change of which mobility node and first gateway which should serve the UE at the new location. When there is a change of the first gateway, the mobility node initiates setup of a tunnel between a second gateway and a new first gateway. When there is a change of the mobility node, the mobility node provides a subscriber server with UE context information comprising mobility node information for a new mobility node which serves UE at the new location. The mobility node transmits updated UE context information comprising mobility node information for the new mobility node to the database.

According to a second aspect, the object is achieved by a method performed by a subscriber server for handling a UE which has moved from an old location to a new location. When there is a change of which mobility node that serves the UE at the new location, the subscriber server obtains, from a new mobility node, UE context information comprising mobility node information for the new mobility node which serves the UE at the new location.

According to a third aspect, the object is achieved by a mobility node for handling a UE which has moved from an old location to a new location. The mobility node is adapted to retrieve UE context information from a database when the UE has moved from the old location to the new location. The UE context information comprises mobility node information for a mobility node which currently serves the UE. The mobility node is further adapted to determine whether there is a change to which mobility node and first gateway which should serve the UE at the new location. The mobility node is adapted to Initiate, when there is a change of the first gateway, setup of a tunnel between a second gateway and a new first gateway. The mobility node is adapted to, provide, when there is a change of the mobility node, a subscriber server 128, 308 with UE context information comprising mobility node information for a new mobility node which serves the UE at the new location. The mobility node is further adapted to provide updated UE context information comprising mobility node information for the new mobility node to the database.

According to a fourth aspect, the object is achieved by a subscriber server for handling a UE which has moved from an old location to a new location. The subscriber server is adapted to obtain, when there is a change to which mobility node that serves the UE at the new location and from a new mobility node, UE context information comprising mobility node information for the new mobility node for the new mobility node which serves the UE at the new location.

According to a fifth aspect, the object is achieved by a method performed by a communications system for handling a UE which has moved from an old location to a new location. The communication system retrieves, at a mobility node, UE context information from a database when the UE has moved from the old location to the new location. The UE context information comprises mobility node information for a mobility node which currently serves the UE. The communications system determines, at the mobility node, whether there is a change to which mobility node and first gateway that should serve the UE at the new location. Then there is a change of the first gateway, the communication system initiates, at the mobility node, setup of a tunnel between a second gateway and a new first gateway. When there is a change of the mobility node, the communication system provides, from the at the mobility node to a subscriber server, UE context information comprising mobility node information for a new mobility node which serves the UE at the new location. When there is a change to which mobility node the UE is associated with when it has moved to the new location, the communications system obtains, at the subscriber server and from a new mobility node, UE context information comprising mobility node information for the new mobility node which serves the UE at the new location. The communications system transmits updated UE context information comprising mobility node information for the new mobility node from the mobility node to the database.

According to a sixth aspect, the object is achieved by a communications system for handling a UE which has moved from an old location to a new location. The communications system is adapted to retrieve, at a mobility node, UE context information from a database when the UE has moved from the old location to the new location. The UE context information comprises mobility node information for a mobility node which currently serves the UE. The communications system is adapted to determine, at the mobility node, whether there is a change to which mobility node and first gateway that should serve the UE at the new location. The communications system is adapted to, when there is a change of the first gateway, initiate, at the mobility node, setup of a tunnel between a second gateway and a new first gateway. The communications system is further adapted to, when there is a change of the mobility node, provide, from the at the mobility node to a subscriber server, UE context information comprising mobility node information for a new mobility node which serves the UE at the new location. The communications system is adapted to, when there is a change to which mobility node that serves the UE at the new location, obtain, at the subscriber server and from a new mobility node, UE context information comprising mobility node information for the new mobility node which serves the UE at the new location. The communications system is further adapted to transmit updated UE context information comprising mobility node information for the new mobility node from the mobility node to the database.

Since the UE context information is stored in a common database which can be accessed from both the old and the new nodes, there is no need to update the old mobility node or the old first gateway during a mobility procedure. With this, the flow of the mobility management procedure is improved by that and the amount of signalling is reduced.

Embodiments herein afford many advantages, of which a non-exhaustive list of examples follows:

By using an external common database, holding the UE context information (mobility node information (e.g. mobility node address), state), that is shared between the mobility node and the new first gateway, it is possible to reduce the signaling significantly. For example the signaling on the S10, S6 and S11 interfaces during a Tracking Area Update is reduced.

With a stateless architecture, there is no need to update the old mobility node or the old first gateway during a mobility procedure. This, since the UE context information with e.g. state and location information is stored in the common database and can be accessed from both the old and new EPC nodes. Therefore, the flow for the mobility procedure can be simplified such that messages can be reduced on several interfaces.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

When the nodes in the core network (e.g. EPC or vEPC systems) are made stateless, and the UE states are stored in the external database which can be read by different nodes, there opens up for new methods of doing mobility management in the EPC system. These opportunities are deployed and taken advantage of with the embodiments herein.

As mentioned earlier, the methods used today for handling the TAU and RAU procedure is signaling intense. Due to the signal intensity, the embodiments herein optimize the handling of the TAU or RAU procedures. Today, messages are sent over the S10, S11 and S5/S8 as well as S6 interfaces. With the optimization of the procedures, signaling costs in terms of Operating Expenditures (OPEX) as well as Capital Expenditures (CAPEX) can be saved with the embodiments herein.

With the stateless architecture of for example the vEPC there is no need to update the old MME or the old SGW during a TAU procedure. This, since the UE context information with e.g. state and location information is stored in the common database and can be accessed from both the old and new EPC nodes. Therefore, the flow for the TAU procedure can be simplified such that messages can be reduced on several interfaces.

The terms old and new used herein refers to before and after a TAU procedure as part of the mobility management of the EPC/LTE system. Using the MME as an example. The MME associated with the UE before the UE moves from one TA to another TA is referred to as an old MME. Similarly, the MME associated with the UE after the UE has moved to the other TA is referred to as a new MME. The old MME may also be referred to as a first MME, a previous MME or an earlier MME or similarly. The new MME may also be referred to as a second MME, a current MME or similarly.

Figure 3:
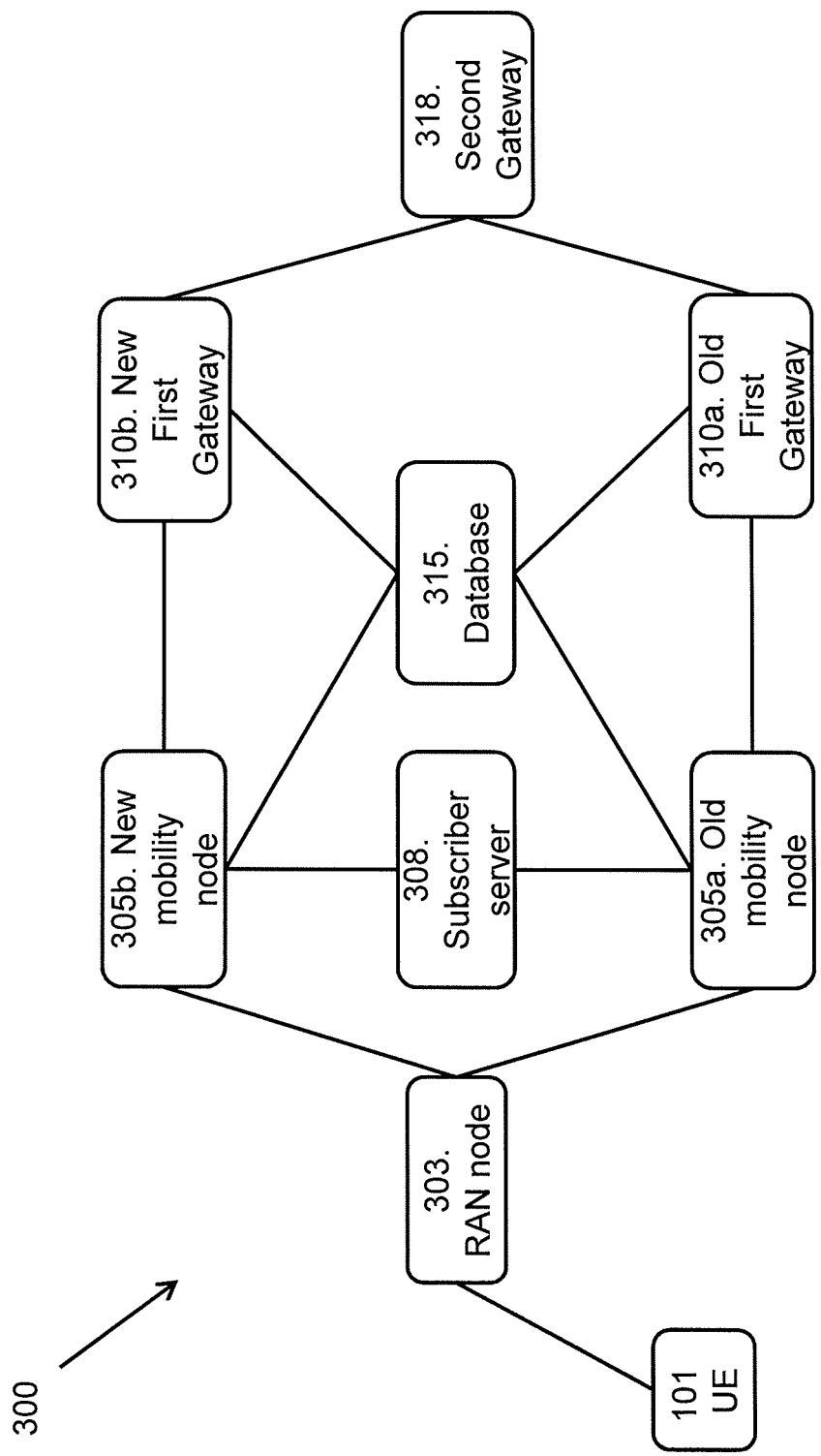
FIG. 3 is a schematic block diagram illustrating embodiments of a communications system.

FIG. 3 depicts a communications system 300 in which embodiments herein may be implemented. In a typical communications system 100 a UE 101, communicates via a RAN to one or more CNs. The communications system 300 may also be referred to as e.g. a wireless communications network, a wireless communications system, a communications network, a communications system, a network or a system.

The communications system 300 further comprises a RAN node 303 serving a cell (not shown). The RAN node 303 may referred to as a base station, a NodeB, an eNB, RNC, Base Station Transceiver (BST) or any other network unit depending on the technology and terminology used. The RAN node 303 is capable to communicate over a radio carrier with the UE 101 being present in the cell.

The UE 101 may be a device by which a subscriber may access services offered by an operator's network and services outside operator's network to which the operators radio access network and core network provide access, e.g. access to the Internet. The UE 101 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another device or a server.

The RAN covers a geographical area which is divided into cell areas, with each cell area being served by a RAN node 303. A cell is a geographical area where radio coverage is provided by the RAN node 303 at a RAN node site. Each cell may be identified by an identity within the local radio area, which is broadcast in the cell. The RAN nodes 303 communicate over the air interface operating on radio frequencies with the UEs 101 within range of the base stations.

It should be noted that the communication links in the communications system 300 may be of any suitable kind including either a wired or wireless link. The link may use any suitable protocol depending on type and level of layer (e.g. as indicated by the OSI model) as understood by the person skilled in the art.

Figure 1:
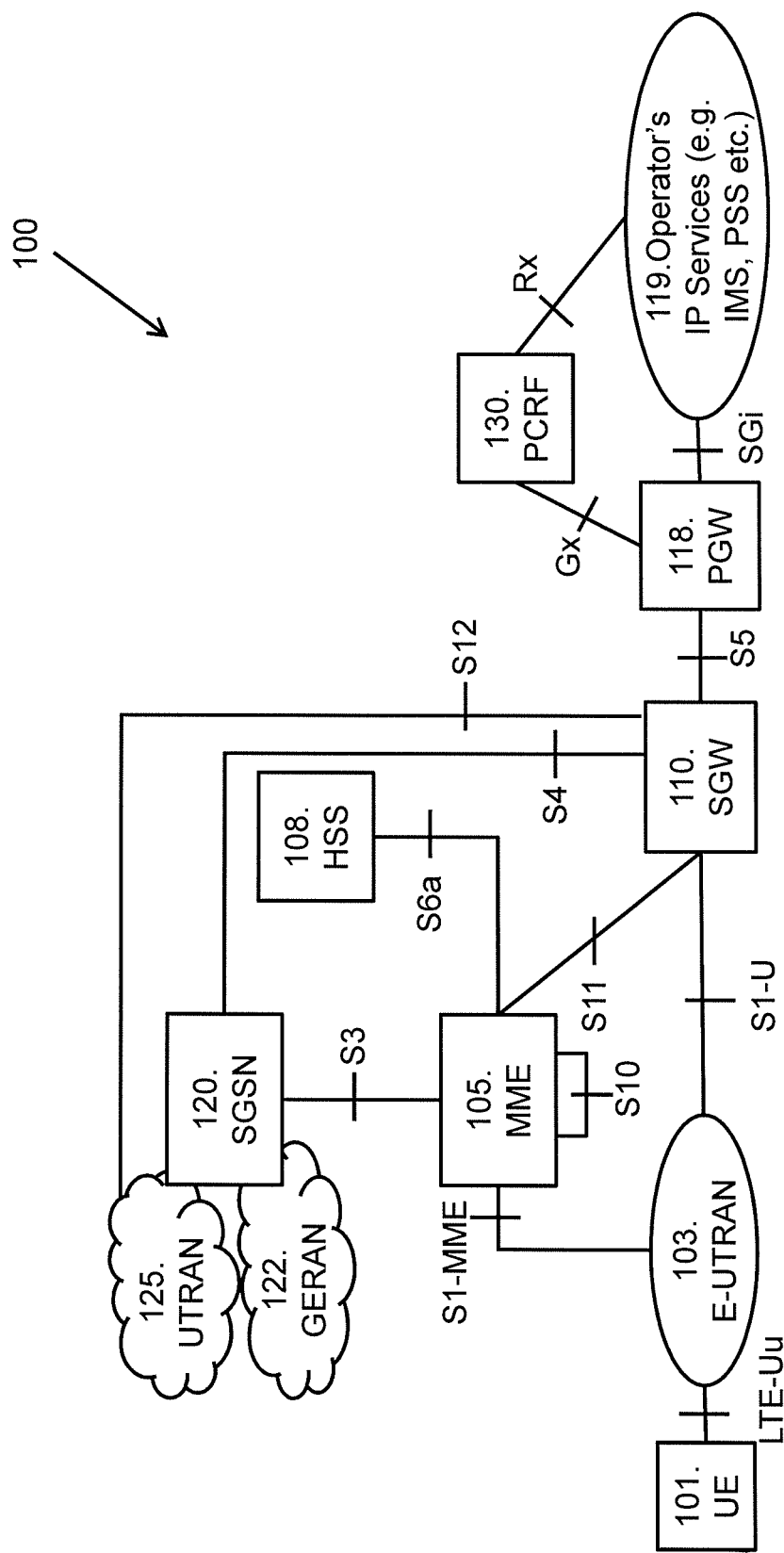
FIG. 1 is a schematic block diagram illustrating embodiments of a communications system.

The communications system 300 comprises an old mobility node 305a and a new mobility node 305b. The MME 105 and the SGSN 120 in FIG. 1 are examples of mobility nodes 305. The old and new mobility nodes 305a, 305b may be separate nodes, they may be functions implemented on nodes or a server etc. The old mobility node 305a is associated with the old location, e.g. an old TA or an old RA which the UE 101 was located in before it moved to the new location. The new mobility node 305b is associated with the new location, e.g. a new TA or a new RA which the UE 101 is located in when it has moved to the new location.

The communications system 300 in FIG. 3 further comprises a subscriber server 308 which may be for example a HSS 108, a HLR etc.

FIG. 3 further illustrates an old first gateway 310a and a new first gateway 310b. The SGW 110 in FIG. 1 is an example of a first gateway. The old and new first gateways 310a, 310b may be separate nodes, they may be functions implemented on nodes or a server etc. The old first gateway 310a is associated with the old location, e.g. an old TA or an old RA which the UE 101 was associated with before it moved to the new location. The new first gateway 310b is associated with the new location, e.g. a new TA or a new RA which the UE 101 is located in when it has moved to the new location.

Note that the nodes in the communications system 300 may be geographically located in proximity to each other, they may be geographically distributed, they may be associated with a central pool, they may be located in the cloud etc.

FIG. 3 also illustrates that the communications system 300 comprises a database 315 which is adapted to be accessible by at least the old and new mobility nodes 105a, 105 and the old and new first gateways 310a, 310b. The database 315 may be seen as a common data base for at least the old and new mobility nodes 105a, 105 and the old and new first gateways 310a, 310b. The database 315 may be collocated with for example the subscriber server 308. The database 315 may be abbreviated DB. The database 315 may comprise information such as for example UE context information. The database 315 may also be referred to as a UE context information database, UE context database or UE information database.

The UE context information may for example comprise International Mobile Subscriber Identity (IMSI), GUTI, Access Point Name (APN) for each PDN connection, APN-Aggregate Maximum Bit Rate (APN-AMBR), PDN type, UE Location (e.g. RA ID or TA ID), the address of the mobility node (e.g. mobility node context) etc.

A second gateway 318 may also be comprised in the communications system 300. The PGW 115 in FIG. 1 is an example of a second gateway 318. The second gateways 318 may be a node, it may be a function implemented on a node or a server etc.

The RAN node 303 may be connected to the old and new mobility nodes 305a, 305b. The old mobility node 305a may be adapted to be connected to the RAN node 303, the subscriber server 308, the database 31 and the old first gateway 310a. The new mobility node 305b may be adapted to be connected to the RAN node 103, the subscriber server 308, the database 315 and the new first gateway 310b. The subscriber server 308 may be adapted to be connected to the old and new mobility nodes 305a, 305. The database 315 may be adapted to be connected to the old and new mobility nodes 305a, 305b and the old and new first gateways 310a, 310b. The old first gateway 310a may be adapted to be connected to the old mobility node 305a, the database 315 and the second gateway 318. The new first gateway 310b may be adapted to be connected to the new mobility node 305b, the database 318 and the second gateway 318.

Note that there may be additional nodes which are comprised in the communications system 300 in addition to the ones exemplified in FIG. 3, for example some of the nodes which are illustrated in FIG. 1. The nodes illustrated in FIG. 3 may be actual nodes, virtualized nodes, or they may be functions implemented in e.g. a server etc.

The method for handling a UE 101 which has moved from an old location to a new location, according to some embodiments will now be described with reference to the signalling diagram depicted in FIG. 4 with reference to the communications system exemplified in FIG. 3. The method in FIG. 4 comprises at least some of the following steps, which steps may as well be carried out in another suitable order than described below:

Step 401

The new mobility node 305b obtains UE context information from the database 315. The obtaining may be performed by sending a request for the UE context information and receiving a response message with the requested information. The UE context information comprises mobility node information for a mobility node 305 which currently serves the UE 101. The mobility node information may be for example the address of the mobility node 305. The mobility node information may be referred to as mobility node context or mobility node context information. The requested UE context information may be referred to as UE information.

Step 402

The new mobility node 305b determines whether there is any change of mobility node 305, first gateway 310 or both mobility node and first gateway 310, or not. For example, the new mobility node 305b may determine whether there is any change of mobility node 305 first, and then whether there has been any change of first gateway 310. In another example, the change of first gateway 310 may be determined first and then the change of mobility node 305 may be determined.

Any mobility node change is an external choice to the mobility node 305 (i.e. it depends on which cell the UE 101 is in and which mobility node 305 the RAN node 303 contacts). But the first gateway change is a choice by the mobility node 305 itself, i.e. an algorithm in the mobility node 305 selects the first gateway 310, so it can select the same old one or a new one.

Step 403

If the new mobility node 305b determined in step 402 that there has been a change of first gateway 310, i.e. the new first gateway 310b is the one who serves the UE 101 at the new location, the new mobility node 305b initiates a setup of a tunnel between the second gateway 318 and the new first gateway 310b. The tunnel may be for example a GPRS Tunneling Protocol (GTP) tunnel, Proxy Mobile IPv6 (PI-MIP) or any other suitable IP-based or non-IP based protocols for carrying signaling in the communications system 300.

Step 404

If the new mobility node 305b determined in step 402 that there has been a change of mobility node 305, the new mobility node 305b provides the subscriber server 308 with UE context information comprising mobility node information for the new mobility node 305b which serves the UE 101 at the new location. In other words, the UE 101 is associated with the new mobility node 305b when it has moved to the new location.

In some embodiments, it may be only the mobility node information for the new mobility node 305b which is transmitted to the subscriber server 308. In other words, only the information in the UE context information which has changed compared to step 401 may be provided to the subscriber server in step 404 instead of the complete UE context information.

The UE context information may comprise location information, state information (whether or not the new mobility node 305b is stateful or stateless). The location information may be the same as the mobility node information mentioned above and may be the location information (e.g. address) of the new mobility node 305b. Furthermore, the UE context information may further comprise for example the identify of the new mobility node 305b, IMSI, Uniform Resource Locator-Flags (ULR-Flags), new mobility node capabilities, Homogeneous Support of IMS Voice over PS Sessions, UE Single Radio Voice Call Continuity (SRVCC) capability, equivalent PLMN list, Mobile Equipment (ME) Identity (International Mobile Station Equipment Identity Software Version (IMEISV)) etc. The UE context information may be referred to as UE information.

Step 405

This step may be performed if there has been a change of mobility node 305. The subscriber server 308 receives the UE context information comprising the mobility node information for the new mobility node 305b, and stores the received information.

Step 406

This step may be performed if there has been a change of mobility node 305. When the subscriber server 308 has received the UE context information, it may determine whether a Cancel Location message should be sent. The decision may be taken based on previously saved state information for the old mobility node 305a.

Step 407

If the new mobility node 305b determined in step 402 that there has been a change of mobility node 305, the new mobility node 305b transmits the UE context information to the database 315. The UE context information comprises the mobility node information for the new mobility node 305b at the new location. This UE context information transmitted to the database in step 315 may be seen as updated UE context information since the mobility node information has been updated or changed compared to the information in step 401. The database 315 receives the UE context information from the new mobility node 305b. The UE context information may indicate the new mobility node 305b that the UE 101 is associated with at the new location. The information may for example include the location information indicating the location of the new mobility node 305b, e.g. the address of the new mobility node 305b. As mentioned above, the UE context information may be referred to as UE information.

In some embodiments, it may be only the mobility node information for the new mobility node 305b which is transmitted to the database 315. In other words, only the information in the UE context information which has changed compared to step 401 may be provided to the database in step 407 instead of the complete UE context information.

Figure 5:
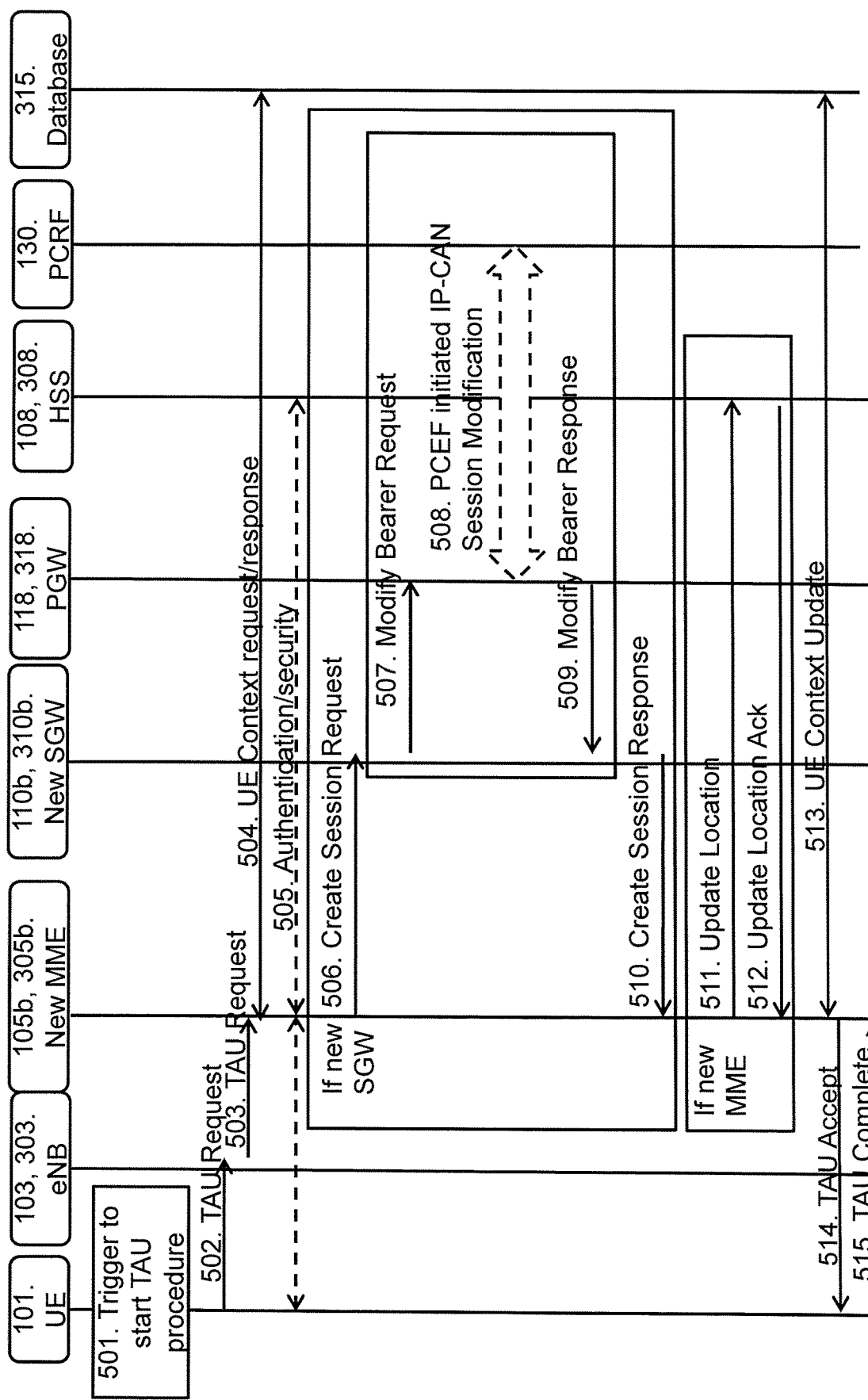
FIG. 5 is a signaling diagram illustrating embodiments of a method.

The old mobility node 105a, 305a can be found in the new mobility node 105b, 305b based on info provided by the UE in step 503 in FIG. 5 (FIG. 5 will be described below), and the mobility node 105, 305 can be found by the first gateway 110, 310 by info that the SGW saves in the database 315, and the subscriber server 108, 308 gets updated by the message 404.

Figure 4:
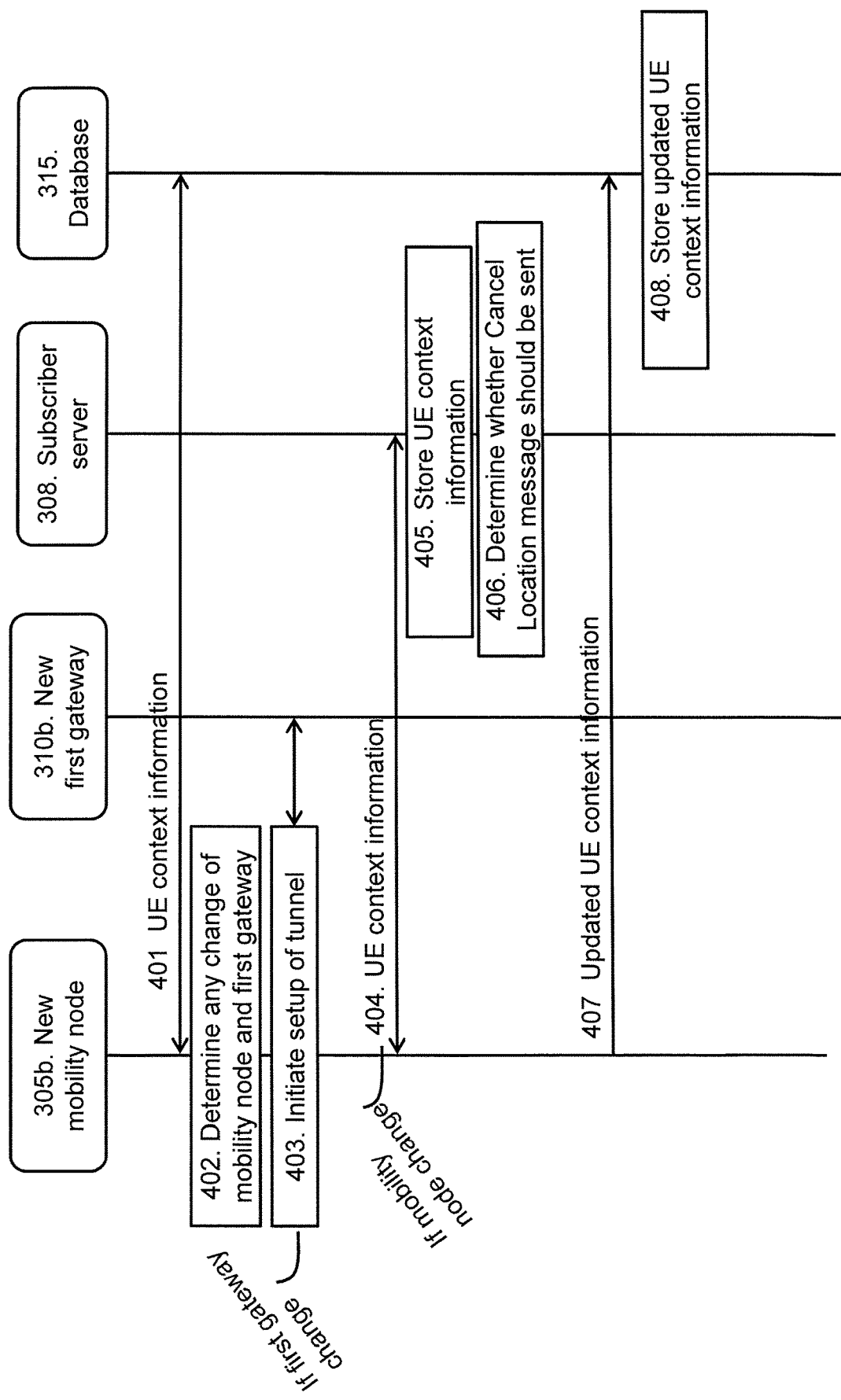
FIG. 4 is a signaling diagram illustrating embodiments of a method.

Some dynamic information may be updated during the procedure in FIG. 4, such as e.g. Tunnel Endpoint Identifier (TEID) and IP address in the network. Such updated information may be transmitted to the database 315 in step 407. In other words, the UE context information transmitted in step 408 may be updated compared to the information retrieved in step 401.

The UE information context record in the database 315 may be locked when it is read by the new mobility node 305b (a state such as e.g. "UE procedure in progress" is set) and then the record is "released" again by the new mobility node 305b in the end when the procedure in FIG. 4 is finished, e.g. after step 408.

Step 408

This step may be performed regardless of whether there has been a change in mobility node 305 or first gateway 310, i.e. it is always done. The database 315 receives the UE context information comprising the mobility node information from the new mobility node 305b, and stores the UE context information.

As described in FIG. 4, the handling of a UE 101 which has moved from an old location to a new location may be decided into for example 4 different cases, namely:
1) No mobility node 305 change and no first gateway 310 change.
2) No mobility node 305 change and first gateway 310 change.
3) Mobility node 305 change and no first gateway 310 change.
4) Mobility node 305 change and first gateway 310 change.

In case 1.) only the database 315 needs to be accessed by the new mobility node 305b. No signalling to other core network nodes is needed.

In case 2.) only signaling to set up tunnels between the second gateway 318 and the new first gateway 310b is needed. Clean-up of the old first gateway 310a is done by other means, e.g. a timer based clean-up procedure.

In case 3.) only signaling towards the subscriber server 308 to update the new first gateway 305b location of the UE 101 is needed.

In case 4.) signaling to set up a tunnel between the second gateway 308 and the new first gateway 310b is needed. Clean-up of the old first gateway 310a may be done by other means, e.g. a timer based clean-up procedure. Since also the mobility node 305 has changed in this case, signaling towards the subscriber server 308 to update the new first gateway 305b location of the UE 101 is needed.

The method for handling a UE 101 which has moved from an old location to a new location, according to some embodiments will now be described with reference to the signalling diagram depicted in FIG. 5. In FIG. 5, the RAN node 303 is represented by an eNB 103, the new mobility node 305b is represented by a new MME 105b, the new first gateway 310b is represented by a new SGW 110b and the second gateway 308 is represented by a HSS 108. The dotted arrows in FIG. 5 indicate that the step is an optional step. The method in FIG. 5 comprises at least some of the following steps, which steps may as well be carried out in another suitable order than described below.

Step 501

A trigger for a TAU procedure occurs. There are several examples of triggers for the TAU procedure. Some example is that the UE 101 detects that it has entered a new TA that is not in the list of TA IDs that the UE 101 has registered with the network, a periodic TA update timer has expired, a Radio Resource Control (RRC) connection has been released etc.

Step 502

The UE 101 initiates the TAU procedure by sending a TAU Request message to the eNB 103, 303. The eNB 101, 303 receives the TAU Request message from the UE 101. The TAU Request message may comprise RRC parameters indicating e.g. a selected network.

Step 503

The eNB 103, 303 derives the new MME 305b from the RRC parameters comprised in the TAU Request message, and sends the TAU Request message to this new MME 105b, 305b. This step 503 may be seen as the eNB 103, 303 forwards the TAU Request message to the new MME 105b, 305b. The new MME 105b, 305b receives the TAU Request message from the eNB 103, 303.

Step 504

This step corresponds to step 401 in FIG. 4. The new MME 105b, 305b obtains UE Context information from the database 315. This may be done by that the new MME 105b, 305b sends a UE context request message to the database 315. The database 315 receives the UE context request message and sends a UE context response message with the UE context information of the new MME 105b, 305b.

Step 505

Authentication and security procedures may take place between the UE 101 and the new MME 105b, 305b, and between the new MME 105b, 305b and the HSS 108, 308. This step 504 may be an optional step. The Authentication may be mandatory if the integrity check of the TAU Request message in step 502 failed.

Steps 506-510 described below may be executed in case there is a new SGW 110b, 310b. Steps 506-510 are performed instead of steps 511-512 which are performed in case there is a new MME 105b, 305b.

Step 506

This step corresponds to step 403 in FIG. 4. If there is a new SGW 110b, 310b, the new MME 105b, 305b sends a Create Session Request message to the new SGW 110b, 310b. The new SGW 110b, 310b receives the Create Session Request message from the new MME 105b, 305b.

If the MME 105b, 305b selected a new SGW 110b, 310b, the new MMW 105b, 305b sends a Create Session Request message per PDN connection to the selected new SGW 110b, 310b. The new MME 105b, 305b may indicate to the SGW 110b, 310b to send the Create Session Request message to the PGW 118, 318.

Step 507

This step corresponds to step 403 in FIG. 4. If there is a new SGW 110b, 310b, the new SGW 110b, 310b sends a Modify Bearer Request message to the PGW 118, 318. The PGW 118, 318 receives the Modify Bearer Request message from the new SGW 110b, 310b.

The new SGW 110*b*, 310*b* informs the PGW 118, 318 about the change of for example the RAT type that e.g. can be used for charging, by sending the message Modify Bearer Request per PDN connection to the PGW 118, 318 concerned.

Step 508

This step corresponds to step 403 in FIG. 4. If there is a new SGW 110*b*, 310*b*, a PCEF initiated IP-CAN Session Modification procedure may take place between the PGW 118, 318 and the PCRF 130. If dynamic Policy and Charging Control (PCC) is deployed and RAT information needs to be conveyed from the PGW 118, 318 to the PCRF 130, the PGW 118, 318 may send RAT information to the PCRF 130 by means of the IP-CAN Session Modification procedure.

Step 509

This step corresponds to step 403 in FIG. 4. If there is a new SGW 110*b*, 310*b*, the PGW 118, 318 sends a Modify Bearer Response message to the new SGW 110*b*, 310*b*. The new SGW 110*b*, 310*b* receives the Modify Bearer Response from the PGW 118, 318. The Modify Bearer Response is a response to the Modify Bearer Request message in step 506. The PGW 118, 318 updates its bearer contexts and returns the Modify Bearer Response.

Step 510

This step corresponds to step 403 in FIG. 4. If there is a new SGW 110*b*, 310*b*, the new SGW 110*b*, 310*b* sends a Create Session Response message to the new MME 105*b*, 305*b*. The new MME 105*b*, 305*b* receives the Create Session Response message from the new SGW 110*b*, 310*b*. The Create Session Response message is a response to the Create Session Request message in step 506. The new SGW 110*b*, 310*b* updates its bearer context. This allows the new SGW 110*b*, 310*b* to route bearer PDUs to the PGW 118, 318 when received from eNB 103, 303. The new SGW 110*b*, 310*b* returns a Create Session Response message to the new MME 105*b*, 305*b*.

Steps 511-512 described below may be executed in case there is a new MME 105*b*, 305*b*. Steps 511-512 are performed instead of steps 506-510 which are performed in case there is a new SGW 110*b*, 310*b*.

Step 511

This step corresponds to step 404 in FIG. 4. If there is a new MMW 105*b*, 305*b*, the new MME 105*b*, 305*b* sends an Update Location message to the HSS 108, 308. The HSS 108, 308 receives the Update Location message.

The new MME 105*b*, 305*b* verifies whether it holds subscription data for the UE 101 identified by the GUTI, the additional GUTI or by the IMSI received with the UE context information from the old CN node. If there are no subscription data in the new MME 105*b*, 305*b* for this UE 101, or for some network sharing scenario if the PLMN-ID of the TAI supplied by the eNB 103, 303 is different from that of the GUTI in the UE's context information, then the new MME 105*b*, 305*b* sends an Update Location Request message to the HSS 108, 308. ULR-Flags indicates that update location is sent from an MME 105*b*, 305*b* and the MME registration shall be updated in HSS 108, 308.

Step 512

This step corresponds to step 404 in FIG. 4. If there is a new MMW 105*b*, 305*b*, the HSS 108, 308 sends an Update Location Acknowledgement message to the new MME 105*b*, 305*b*. The new MME 105*b*, 305*b* receives the Update Location Acknowledgement message from the HSS 108, 308. The HSS 108, 308 acknowledges the Update Location Request message by sending an Update Location Acknowledgment message to the new MME 105*b*, 305*b*. The Update Location Acknowledgement message may comprise the IMSI in addition to Subscription Data.

Step 513

This step corresponds to step 407 in FIG. 4. The new MME 105*b*, 305*b* sends a TAU Accept message to the UE 101. The UE 101 receives the TAU Accept message from the new MME 105*b*, 305*b*.

Step 514

The UE 101 sends a TAU Complete message to the new MME 105*b*, 305*b*. The new MME 105*b*, 305*b* receives the TAU complete message from the UE 101.

If a GUTI was included in the TAU Accept message in step 513, the UE 101 acknowledges the received message by returning a TAU Complete message to the new MME 105*b*, 305*b*. The TAU Complete message is an optional message, indicated with a dotted arrow in FIG. 5.

Figure 2:
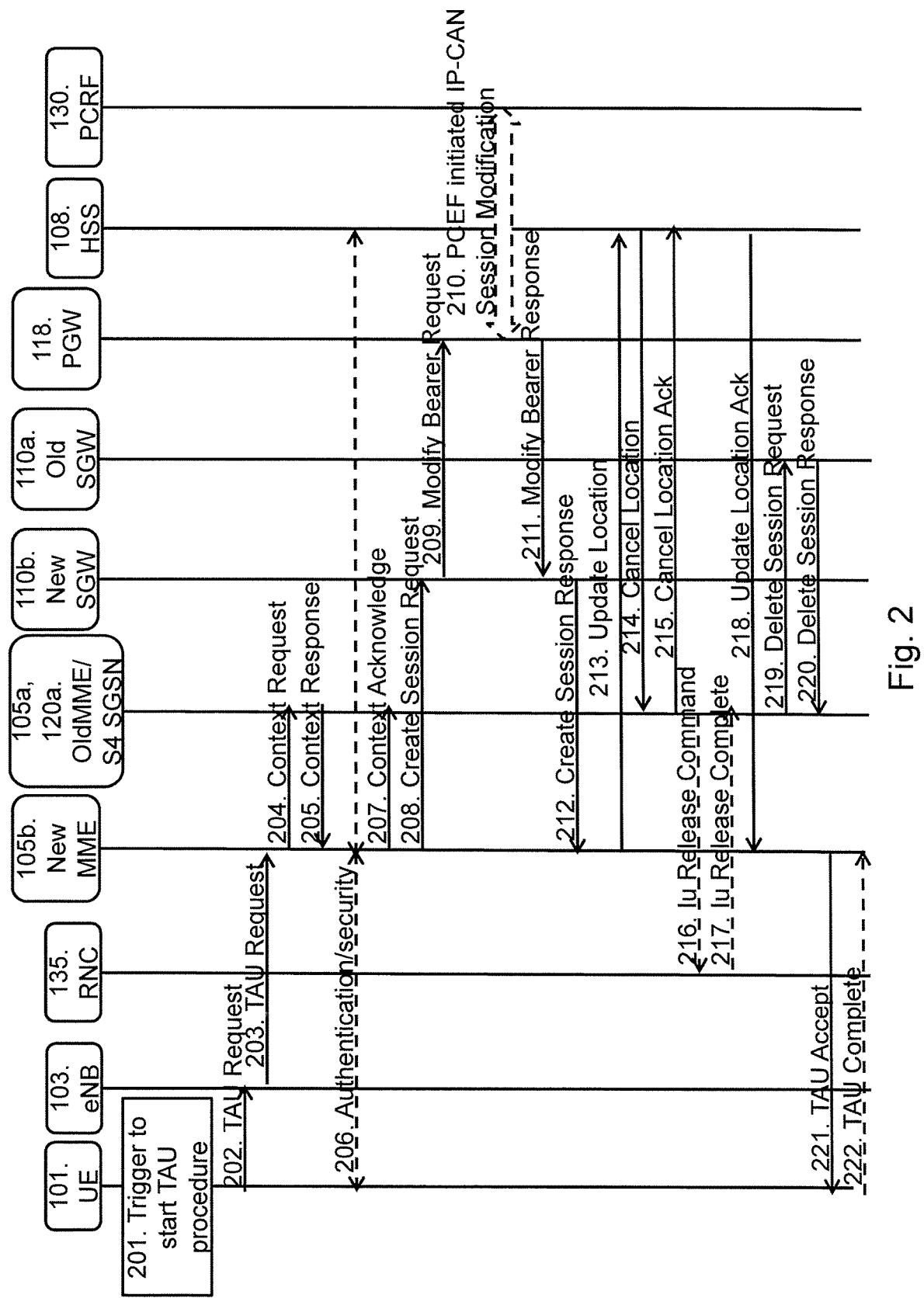
FIG. 2 is a signaling diagram illustrating embodiments of a method.

When comparing FIG. 5 with FIG. 2, it is seen that steps 204, 205, 207, 214-217 and 218-220 of FIG. 2 are not performed in FIG. 5. Thus the signaling in FIG. 5 is reduced compared to the legacy procedure illustrated in FIG. 2. The embodiments herein takes advantage of a stateless nodes sharing an external database 315 which will significantly reduce the amount of signaling for the four cases described and below above.

The handling in EPC of a TAU Request from a UE 101 can be divided into for example 4 different cases, namely:
1) Intra-MME TAU with no SGW change.
2) Intra-MME TAU with SGW change.
3) Inter-MME TAU with no SGW change.
4) Inter-MME TAU with SGW change.

"Intra" refers to that there has not been any change of MME and "inter" refers to that there has been a change of MME. The example cases 1-4 above is also applicable to for example RAU, but this is not described here in detail for the sake of simplicity.

In case 1.) only the database 315 needs to be accessed (Read/Write (R/W)) by the MME 105*b*, 305*b*. No signalling to other EPC nodes is needed.

In case 2.) only signaling to set up tunnels (e.g. GTP tunnels) between the PGW 118, 318 and the new SGW 110*b*, 310*b* is needed. This is done by the Create Session and Modify Bearer procedures (see FIG. 5). Clean-up of the old SGW 110*a*, 310*a* is done by other means, e.g. a timer based clean-up procedure. There needs to be some procedure for releasing orphan TEIDs etc. in the old SGW 110*a*, 310*a* user plane. Orphan or hanging PDN connections in the old SGW UP will never be utilized, and there may be an inactivity timer used to release them. The old SGW Control Plane (CP) is stateless, and therefore there is nothing to clean up.

In case 3.) only signaling towards the HSS 108, 308 to update the new MME 105*b*, 305*b* location of the UE 101 is needed. This is done by the Update Location procedure (see FIG. 5). A MME location refers to the TA where the UE 101 is located and in which the UE 101 is associated with the MME 105*b*, 305*b*.

In case 4.) signaling to set up tunnels (e.g. GTP tunnels) between the PGW 118, 318 and the new SGW 110*b*, 310*b* is needed. This is done by the Create Session and Modify Bearer procedures (see FIG. 5). Clean-up of the old SGW 110*a*, 310*a* may be done by other means, e.g. a timer based clean-up procedure. Since also the MME 105*b*, 305*b* has changed in this case, signaling towards the HSS 108, 308 to update the new MME 105*b*, 305*b* location of the UE 101 is needed. This is done by the Update Location procedure (see FIG. 5).

Figure 6:
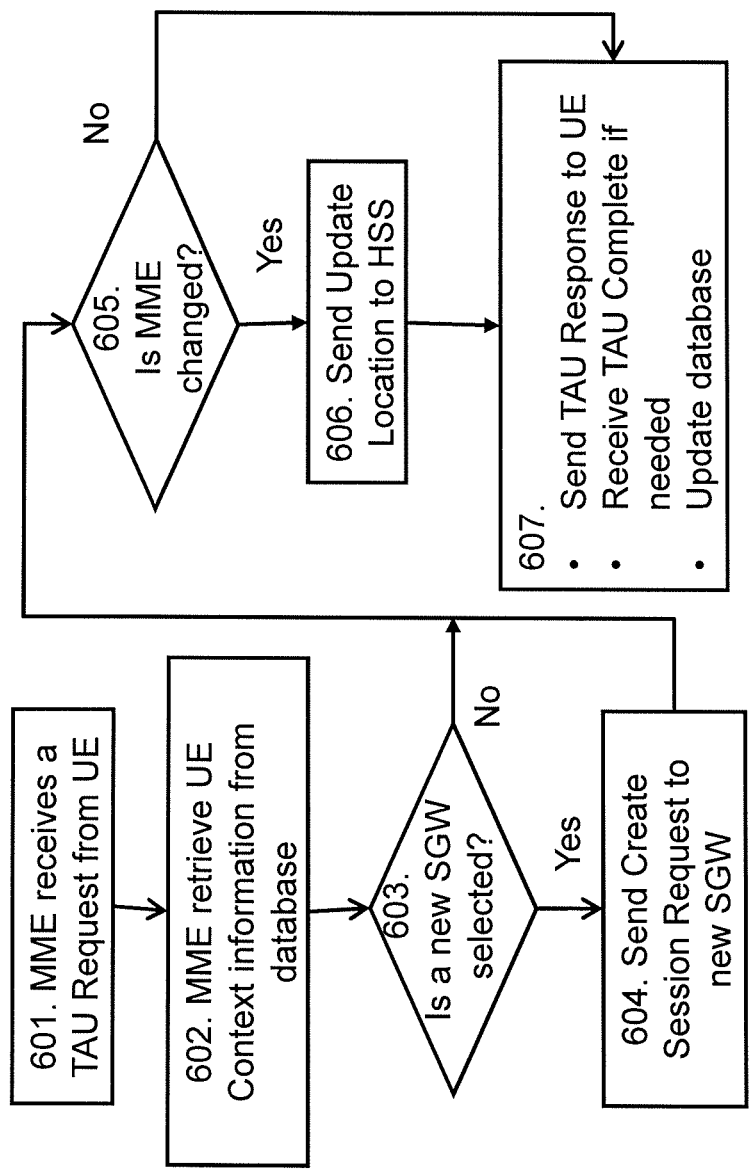
FIG. 6 is a flow chart illustrating embodiments of a method.

FIG. 6 shows a flow chart for a method performed by the new MME 105b, 305b for the network signaling during the TAU procedure according to the embodiments herein.

The method in FIG. 6 comprises at least some of the following steps, which steps may be performed in any suitable order than described below:

Step 601

This step corresponds to steps 502 and 503 in FIG. 5. The UE 101 sends a TAU Request message to the new MME 105b, 305b, and the MME 105b, 305b receives the TAU Request message from the UE 101.

Step 602

This step corresponds to step 401 in FIG. 4 and step 504 in FIG. 5. The new MME 105b, 305b retrieves the UE Context information from the database 315.

Step 603

This step corresponds to step 402 in FIG. 4. The MME 105b, 305b checks whether a new SGW 110b, 310b is selected. The new SGW 110b, 310b has been selected by the MME 105b, 305b. If a new SGW 110b, 310b is selected, the method proceeds to step 604, indicated with "yes" in FIG. 6". If a new SGW 110b, 310b is not selected, the method proceeds to step 305, indicated with "no" in FIG. 6.

Step 604

This step corresponds to step 403 in FIG. 4 and step 506 in FIG. 5. This step is performed if a new SGW 110b, 310b is selected. The new MME 105b, 305b sends a Create Session Request message to the selected new SGW 110b, 310b. The new SGW 110b, 310b receives the Create Session request message from the new MME 110b, 310b.

Step 605

This step corresponds to step 402 in FIG. 4. This step is performed after step 603 in case a new SGW 110b, 310b is not selected, or the step is performed after step 604. The new MME 105b, 305b checks if the MME 105, 305 has been changed. If the MME 105, 305 has been changed, the method proceeds to step 606, indicated with "yes" in FIG. 6. If the MME 105, 305 has not been changed, the method proceeds to step 607, indicated with "no" in FIG. 6.

Step 606

This step corresponds to step 404 in FIG. 4 and step 511 in FIG. 5. This step is performed if the MME 105, 305 has been changed. The new MME 105b, 305b sends an Update Location message to the HSS 108, 308. The HSS 108, 308 receives the Update Location message from the new MME 105b, 305b.

Step 607

This step corresponds to steps 407 and 408 in FIG. 4 and steps 513, 514 and 515 in FIG. 5. This step is performed after step 605 if the MME 105, 305 has not been changed, or it is performed after step 605. The new MME 105b, 305b sends a TAU Response message to the UE 101. The UE 101 receives the TAU Response message from the new MME 105b, 305b. The new MME 105b, 305b may receive a TAU Complete message from the UE 101 if it is needed. The new MME 105b, 305b updates the database 315.

Figure 7:
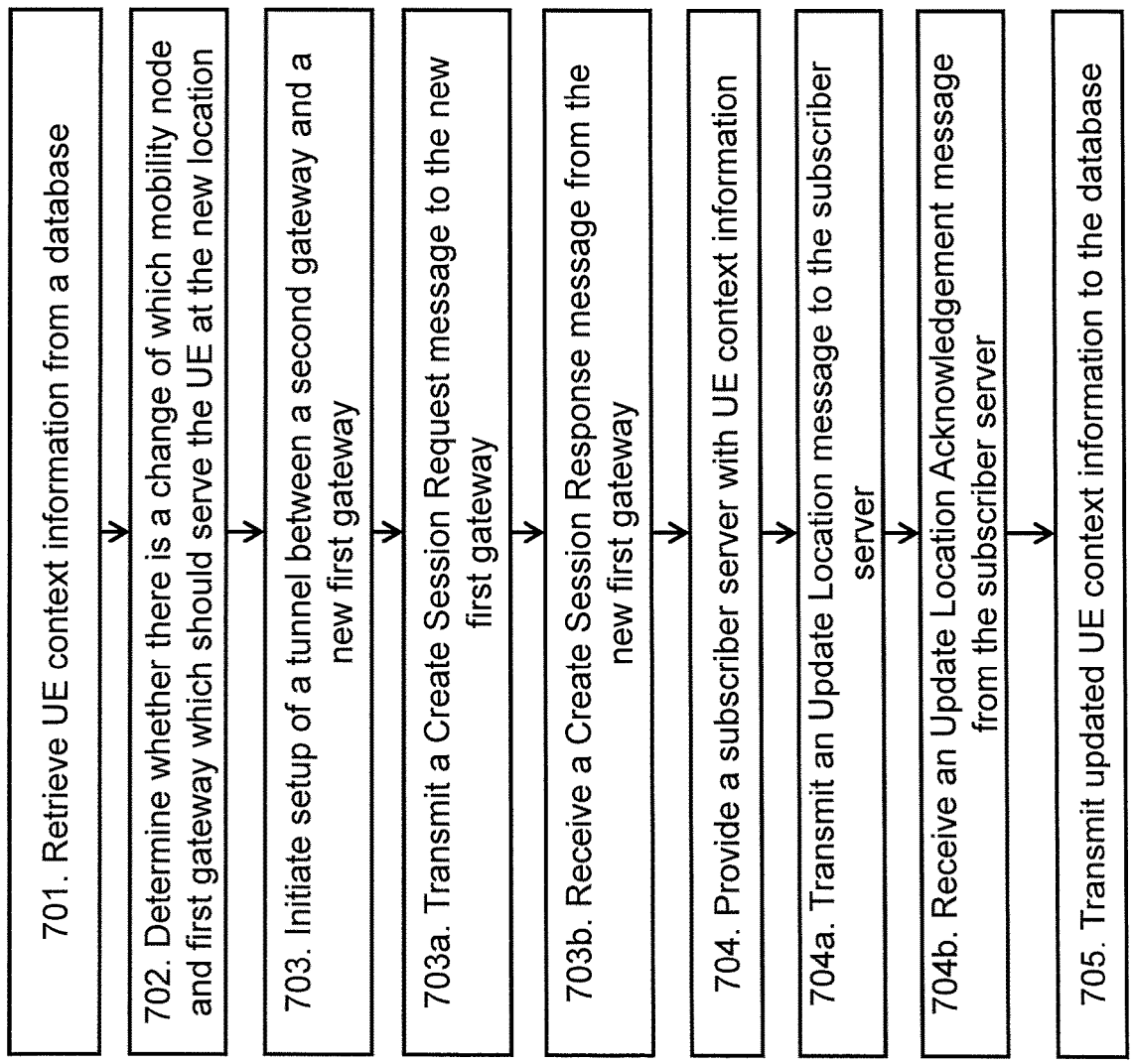
FIG. 7 is a flow chart illustrating embodiments of a method performed by a mobility node.

The method described above will now be described seen from the perspective of the mobility node 105a, 105b, 305a, 305b. FIG. 7 is a flowchart describing the present method performed by the mobility node 105a, 105b, 305a, 305b, for handling a UE 101 which has moved from an old location to a new location. The mobility node 105a, 105b, 305a, 305b may be a new mobility node 105b, 305b or an old mobility node 105a, 305a. The movement of the UE 101 from the old location to the new location may be a TAU procedure or a RAU procedure. The mobility node 105a, 105b, 305a, 305b may be a MME or a vMME.

The method in FIG. 7 comprises at least some of the following steps to be performed by the mobility node 105a, 105b, 305a, 305b, which steps may be performed in any suitable order than described below:

Step 701

This step corresponds to step 401 in FIG. 4 and step 602 in FIG. 6. The mobility node 105a, 105b, 305a, 305b retrieves UE context information from a database 315 when the UE 101 has moved from the old location to the new location. The UE context information comprises mobility node information for a mobility node 105a, 105b, 305a, 305b which currently serves the UE 101. The mobility node 105a, 105b, 305a, 305b which currently serves the UE 101 may be the old mobility node 105a, 305a or the new mobility node 105b, 305b. The retrieval of the UE context information may be performed by that the mobility node 105a, 105b, 305a, 305b sends a request message to the database 315, i.e. a request for the UE context information, and the mobility node 105a, 105b, 305a, 305b receives a response message with the requested UE context information from the database 315.

Step 702

This step corresponds to step 402, 500a, 500b, 603, 605 in FIG. 6. The mobility node 105a, 105b, 305a, 305b determines whether there is a change of which mobility node 105a, 105b, 305a, 305b and first gateway 110a, 110b, 310a, 310b which should serve the UE 101 at the new location. For example, the old mobility node 105a, 305a may have been serving the UE 101 at the old location and there has been a change so that it is the new mobility node 105b, 305b which serves the UE 101 at the new location. In another example, a first old gateway 110a, 310a have been serving the UE 101 at the old location and there has been a change to that it is the new first gateway 110b, 310b which serves the UE 101 at the new location. In a further example, the old mobility node 105a, 305b serves the UE 101 at both the old and new location and the old first gateway 110b, 310b serves the UE 101 at both the old and new location, i.e. there has not been any change.

In some embodiments, there is no signaling towards an old mobility node 105a, 305a and an old first gateway 110a, 310a when it has not been any change of mobility node 105a, 105b, 305a, 305b and first gateway 110a, 110b, 310a, 310b.

Step 703

This step corresponds to step 403 in FIG. 4, steps 506 and 510 in FIG. 5 and step 604 in FIG. 6. When there is a change of the first gateway 110a, 110b, 310a, 310b, the mobility node 105a, 105b, 305a, 305b initiates setup of a tunnel between a second gateway 115, 318 and a new first gateway 110b, 310b. The new first gateway 110b, 310b is the first gateway which serves the UE 101 at the new location. The tunnel may be for example a GTP tunnel or a PMIP tunnel.

The setup of the tunnel may be initiated when there is a change of first gateway 110a, 110b, 310a, 310b and mobility node 105a, 105b, 305a, 305b, and when there is a change of first gateway 110a, 110b, 310a, 310b and no change of mobility node 105a, 105b, 305a, 305b.

Step 703a

This step may be seen as a substep of step 703. This step corresponds to step 506 in FIG. 5. Step 703a may be performed when there is a change of the first gateway 110a, 110b, 310a, 310b. The mobility node 105a, 105b, 305a, 305b may transmit a Create Session Request message to the new first gateway 110b, 310b.

Step 703b

This step may be seen as a substep of step 703, and a step which may be performed after step 703a. This step corresponds to step 510 in FIG. 5. Step 703b may be performed when there is a change of the first gateway 110a, 110b, 310a, 310b. The mobility node 105a, 105b, 305a, 305b receives a Create Session Response message from the new first gateway 110b, 310b.

Step 704

This step corresponds to step 404 in FIG. 4, steps 511 and 512 in FIG. 5 and step 606 in FIG. 6. When there is a change of the mobility node 105a, 105b, 305a, 305b, the mobility node 105a, 105b, 305a, 305b provides the subscriber server 128, 308 with UE context information comprising mobility node information for a new mobility node 105b, 305b which serves UE 101 at the new location. In other words, the change is from the old mobility node 105a, 305a to the new mobility node 105b, 305b.

The provided UE context information may further comprise state information indicating whether a mobility node 105a, 105b, 305a, 305b which serves the UE 101 is stateless or stateful. In some embodiments, at least one of an old mobility node 105a, 305a, a new mobility node 105b, 305b, an old first gateway 110a, 310a and the new first gateway 110b, 310b are stateless.

The subscriber server 128, 308 may be provided with information about the new mobility node 105b, 305b when there is a change of mobility node 105a, 105b, 305a, 305b and first gateway 110a, 110b, 310a, 310b, and when there is a change of mobility node 105a, 105b, 305a, 305b and no change of first gateway 110a, 110b, 310a, 310b.

Step 704a

This step may be seen as a substep of step 704, and a step which is performed before step 704b. This step corresponds to step 511 in FIG. 5. Step 704a may be performed when there is a change of the mobility node 105a, 105b, 305a, 305b. The mobility node 105a, 105b, 305a, 305b may transmit an Update Location message to the subscriber server 128, 308. The Update Location message may comprise the UE context information, and the UE context information may comprise mobility node information for the new mobility node 105b, 305b.

Step 704b

This step may be seen as a substep of step 704, and a step which is performed after step 704a. This step corresponds to step 512 in FIG. 5. Step 704b may be performed when there is a change of the mobility node 105a, 105b, 305a, 305b. The mobility node 105a, 105b, 305a, 305b may receive an Update Location Acknowledgement message from the subscriber server 128, 308.

Step 705

This step corresponds to step 407 in FIG. 4. The mobility node 105a, 105b, 305a, 305b transmits updated UE context information comprising mobility node information for the new mobility node 105b, 305b to the database 315. The updated UE context information is updated compared to the UE context information in step 701. The information is updated in the sense that the mobility node information is for the new mobility node 105b, 305b which serves the UE 101 at the new location.

Figure 8:
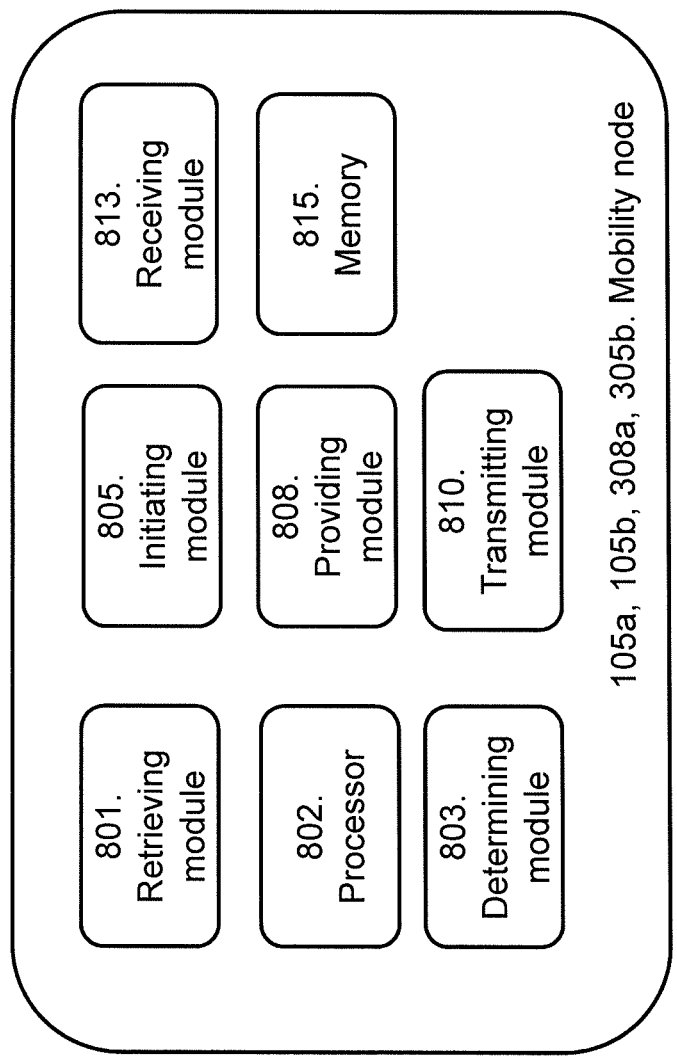
FIG. 8 is a schematic block diagram illustrating embodiments of a mobility node.

To perform the method steps shown in FIG. 7 for handling a UE 101 which has moved from an old location to a new location, the mobility node 105a, 105b, 305a, 305b may comprise an arrangement as shown in FIG. 8. The movement of the UE 101 from the old location to the new location may be a TAU procedure or a RAU procedure. The mobility node 105a, 105b, 305a, 305b may be a MME or a vMME.

To perform the method steps shown in FIG. 7 for handling a UE 101 which has moved from an old location to a new location, the mobility node 105a, 105b, 305a, 305b is adapted to, e.g. by means of a retrieving module 801, retrieve UE context information from a database 315 when the UE 101 has moved from the old location to the new location. The UE context information comprises mobility node information for a mobility node 105a, 105b, 305a, 305b which currently serves the UE 101. The retrieving module 801 may also be referred to as a retrieving unit, a retrieving means, a retrieving circuit, means for retrieving etc. The retrieving module 801 may be a processor 802 of the mobility node 105a, 105b, 305a, 305b.

The mobility node 105a, 105b, 305a, 305b is further adapted to, e.g. by means of a determining module 803, determine whether there is a change to which mobility node 105a, 105b, 305a, 305b and first gateway 110a, 110b, 310a, 310b which should serve the UE 101 is at the new location. The determining module 803 may also be referred to as a determining unit, a determining means, a determining circuit, means for determining etc. The determining module 803 may be the processor 802 of the mobility node 105a, 105b, 305a, 305b.

The mobility node 105a, 105b, 305a, 305b is adapted to, e.g. by means of an initiating module 805, initiate setup of a tunnel between a second gateway 115, 318 and a new first gateway 110b, 310b. The setup is initiated when there is a change of the first gateway 110a, 110b, 310a, 310b. The setup of the tunnel may be initiated when there is a change of first gateway 110a, 110b, 310a, 310b and mobility node 105a, 105b, 305a, 305b and when there is a change of first gateway 110a, 110b, 310a, 310b and no change of mobility node 105a, 105b, 305a, 305b. The initiating module 805 may also be referred to as an initiating unit, an initiating means, an initiating circuit, means for initiating etc. The initiating module 805 may be the processor 802 of the mobility node 105a, 105b, 305a, 305b.

The mobility node 105a, 105b, 305a, 305b is further adapted to, e.g. by means of a providing module 808, provide a subscriber server 128, 308 with UE context information comprising mobility node information for a new mobility node 105b, 305b which serves the UE 101 at the new location. The provided UE context information may further comprises state information indicating whether a mobility node 105a, 305a which the UE 101 is associated with is stateless or stateful. At least one of an old mobility node 105a, 305a, a new mobility node 105b, 305b, an old first gateway 110a, 310a and the new first gateway 110b, 310b may be stateless. The providing module 808 may also be referred to as a providing unit, a providing means, a providing circuit, means for providing etc. The providing module 808 may be the processor 802 of the mobility node 105a, 105b, 305a, 305b.

The UE context information is provided to the subscriber server when there is a change of the mobility node 105a, 105b, 305a, 305b. There may be no signalling towards an old mobility node 105a, 305a and an old first gateway 110a, 310a when it has not been any change of mobility node 105a, 105b, 305a, 305b and first gateway 110a, 110b, 310a, 310b.

The subscriber server 128, 308 may be provided with information about the new mobility node 105b, 305b when there is a change of mobility node 105a, 105b, 305a, 305b and first gateway 110a, 110b, 310a, 310b, and when there is a change of mobility node 105a, 105b, 305a, 305b and no change of first gateway 110a, 110b, 310a, 310b.

The mobility node 105a, 105b, 305a, 305b is further adapted to, e.g. by means of the providing module 808, provide updated UE context information comprising mobility node information for the new mobility node 105b, 305b to the database 315.

The mobility node 105a, 105b, 305a, 305b may be further adapted to, e.g. by means of a transmitting module 810, transmit a Create Session Request message to the new first gateway 110b, 310b. The transmitting module 810 may also be referred to as a transmitting unit, a transmitting means, a transmitting circuit, means for transmitting, output unit etc. The transmitting module 810 may be a transmitter, a transceiver etc. The transmitting module 810 may be a wireless transmitter of the mobility node 105a, 105b, 305a, 305b of a wireless or fixed communications system. The transmitting module 810 may be the same as the providing module 808.

The mobility node 105a, 105b, 305a, 305b may be further adapted to, e.g. by means of a receiving module 813, receive a Create Session Response message from the new first gateway 110b, 310b. The receiving module 813 may also be referred to as a receiving unit, a receiving means, a receiving circuit, means for receiving, input unit etc. The receiving module 813 may be a receiver, a transceiver etc. The receiving module 813 may be a wireless receiver of the mobility node 105a, 105b, 305a, 305b of a wireless or fixed communications system. The receiving module 813 may be the same as the retrieving module 801.

The mobility node 105a, 105b, 305a, 305b may be further adapted to, e.g. by means of the transmitting module 810, transmit an Update Location message to the subscriber server 128, 308. The Update Location message comprises the UE context information comprising mobility node information for the new mobility node 105b, 305b.

The mobility node 105a, 105b, 305a, 305b may be further adapted to, e.g. by means of the receiving module 813, receive an Update Location Acknowledgement message from the subscriber server 128, 308.

The mobility node 105a, 105b, 305a, 305b may further comprise a memory 815 comprising one or more memory units. The memory 815 is arranged to be used to store data, received data streams, power level measurements, UE context information, mobility node information, updated UE context information, information indicating change of mobility node and first gateway, information indicating tunnels, messages, request messages, response messages, information indicating whether a mobility node is stateful or stateless, information indicating whether the movement of the UE 101 is due to a RAU or a TAU, threshold values, time periods, configurations, schedulings, and applications to perform the methods herein when being executed in the mobility node 105a, 105b, 305a, 305b. The memory 815 comprises instructions executable by the processor 802.

Those skilled in the art will also appreciate that the retrieving module 801, the determining module 803, the initiating module 805, the providing module 808, the transmitting module 810 and the receiving module 813 described above may refer to a combination of analog and digital circuits, and/or one or more processors configured with software and/or firmware, e.g. stored in a memory, that when executed by the one or more processors such as the processor 802 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In some embodiments, a first computer program may comprise instructions which, when executed on at least one processor (e.g. processor 802), cause the at least one processor to carry out the method steps in FIGS. 4, 5, 6 and in FIG. 7 performed by the mobility node 105a, 105b, 305a, 305b. A first carrier may comprise the computer program, and the first carrier is one of an electronic signal, optical signal, radio signal or computer readable storage medium.

Figure 9:
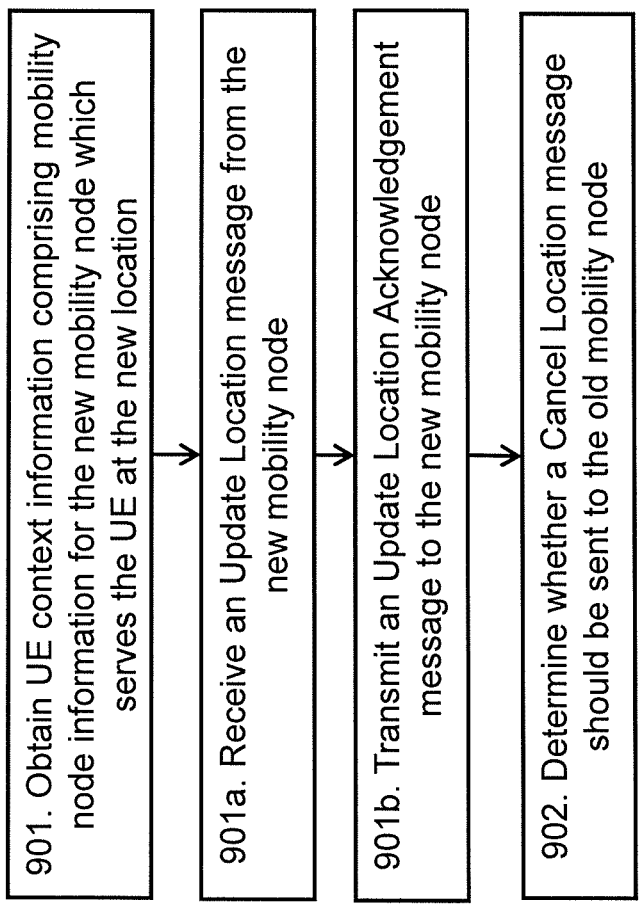
FIG. 9 is a flow chart illustrating embodiments of a method performed by a subscriber server.

The method described above will now be described seen from the perspective of the subscriber server 128, 308. FIG. 9 is a flowchart describing the present method performed by the subscriber server 128, 308 for handling a UE 101 which has moved from an old location to a new location. The subscriber server 128, 308 may be a HSS, a vHSS, a HLR or a vHLR. The movement of the UE 101 from the old location to the new location may be a TAU procedure or a RAU procedure.

The method in FIG. 9 comprises at least some of the following steps to be performed by the subscriber server 128, 308, which steps may be performed in any suitable order than described below:

Step 901

This step corresponds to step 404 in FIG. 4, steps 511 and 512 in FIG. 5 and step 606 in FIG. 6. When there is a change of which mobility node 105a, 105b, 305a, 305b that serves the UE 101 at the new location, the subscriber server 128, 308 obtains, from a new mobility node 105b, 305b, UE context information. The UE context information comprises mobility node information for the new mobility node 105b, 305b which serves the UE 101 at the new location.

The obtained UE context information may further comprise state information indicating whether the new mobility node 105b, 305b is stateless or stateful. At least one of an old mobility node 105a, 305a, a new mobility node 105b, 305b, an old first gateway 110a, 310a and the new first gateway 110b, 310b may be stateless.

The subscriber server 128, 308 may obtain the UE context information when there is a change of mobility node 105a, 105b, 305a, 305b and first gateway 110a, 110b, 310a, 310b, and when there is a change of mobility node 105a, 105b, 305a, 305b and no change of first gateway 110a, 110b, 310a, 310b.

Step 901a

This step may be seen as a substep of step 901. This step corresponds to step 511 in FIG. 5. The subscriber server 128, 308 may receive an Update Location message from the new mobility node 105b, 305b. The Update Location message comprises the UE context information comprising the mobility node information for the new mobility node 105b, 305b.

Step 901b

This step may be seen as a substep of step 901, and a step which may be performed after step 901a. This step corresponds to step 512 in FIG. 5. The subscriber server 128, 308 may transmit an Update Location Acknowledgement message to the new mobility node 105b, 305b.

Step 902

This step corresponds to step 406 in FIG. 4. Based on previously saved state information for the old mobility node 105a, 305a, the subscriber server 128, 308 may determine whether a Cancel Location message should be sent to the old mobility node 105a, 305a. The Cancel Location message may not be sent to the old mobility node 105a, 305a when the previously saved state information indicates that the old mobility node 105a, 305a is stateless. The Cancel Location message may be sent to the old mobility node 105a, 305a when the previously saved state information indicates that the old mobility node 105a, 305a is stateful.

Figure 10:
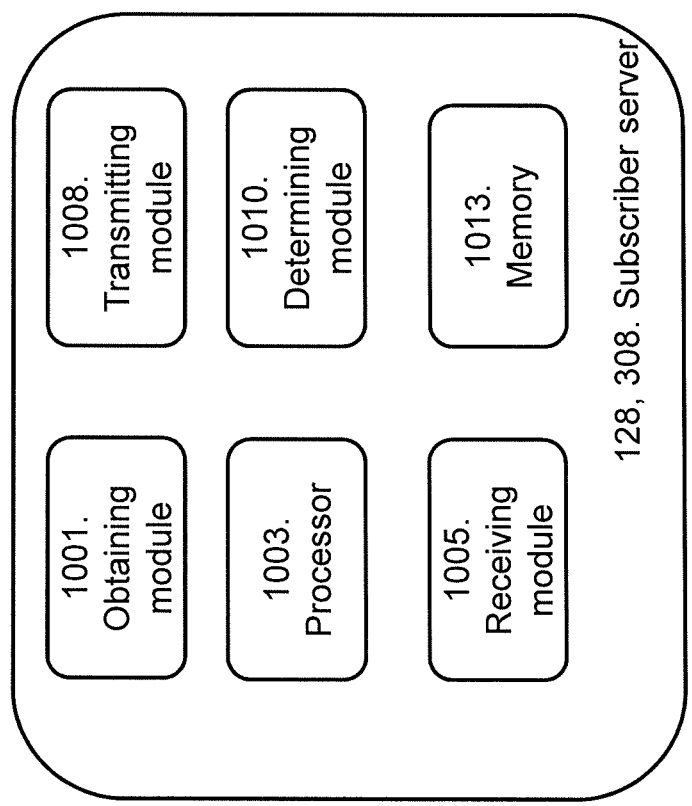
FIG. 10 is a schematic block diagram illustrating embodiments of a subscriber server.

To perform the method steps shown in FIG. 9 for handling a UE 101 which has moved from an old location to a new location, the subscriber server 128, 308 may comprise an arrangement as shown in FIG. 10. The subscriber server 128, 308 may be a HSS, a vHSS, a HLR or a vHLR. The movement of the UE 101 from the old location to the new location may be a TAU procedure or a RAU procedure.

To perform the method steps shown in FIG. 9 for handling a UE 101 which has moved from an old location to a new location, the subscriber server 128, 308 is adapted to, e.g. by means of an obtaining module 1001, obtain, from a new mobility node 105b, 305b, UE context information. The UE context information comprises mobility node information for the new mobility node 105b, 305b for the new mobility node 105b, 305b which serves the UE 101 at the new location. The UE context information is obtained when there is a change to which mobility node 105a, 105b, 305a, 305b that serves the UE 101 at the new location. The obtained UE context information may further comprise state information indicating whether the new mobility node 105b, 305b is stateless or stateful. At least one of an old mobility node 105a, 305a, a new mobility node 105b, 305b, an old first gateway 110a, 310a and the new first gateway 110b, 310b may be stateless. The obtaining module 1001 may also be referred to as an obtaining unit, an obtaining means, an obtaining circuit, means for obtaining etc. The obtaining module 1001 may be a processor 1003 of the subscriber server 128, 308.

The subscriber server 128, 308 may be further adapted to, e.g. by means of a receiving module 1005, receive an Update Location message from the new mobility node 105b, 305b. The Update Location message may comprise the UE context information, and the UE context information may comprise mobility node information for the new mobility node 105b, 305b. The receiving module 1005 may be the same as the obtaining module 1001. The receiving module 1005 may also be referred to as a receiving unit, a receiving means, a receiving circuit, means for receiving, input unit etc. The receiving module 1005 may be a receiver, a transceiver etc. The receiving module 1005 may be a wireless receiver of the subscriber server 128, 308 of a wireless or fixed communications system.

The subscriber server 128, 308 may be further adapted to, e.g. by means of a transmitting module 1008, transmit an Update Location Acknowledgement message to the new mobility node 105b, 305b. The transmitting module 1008 may be the same as the obtaining module 1001. The transmitting module 1008 may also be referred to as a transmitting unit, a transmitting means, a transmitting circuit, means for transmitting, output unit etc. The transmitting module 1008 may be a transmitter, a transceiver etc. The transmitting module 1008 may be a wireless transmitter of the subscriber server 128, 308 of a wireless or fixed communications system.

The subscriber server 128, 308 may be further adapted to, e.g. by means of a determining module 1010, determine whether a Cancel Location message should be sent to the old mobility node 105a, 305a. The decision may be taken based on previously saved state information for the old mobility node 105a, 305a. The Cancel Location message may not be sent to the old mobility node 105a, 305a when the previously saved state information indicates that the old mobility node 105a, 305a is stateless. The Cancel Location message may be sent to the old mobility node 105a, 305a when the previously saved state information indicates that the old mobility node 105a, 305a is stateful. The determining module 1010 may also be referred to as a determining unit, a determining means, a determining circuit, means for determining etc. The determining module 1010 may be the processor 1003 of the subscriber server 128, 308.

The subscriber server 128, 308 may be further adapted to, e.g. by means of the obtaining module 1001, obtain the UE context information when there is a change of mobility node 105a, 105b, 305a, 305b and first gateway 110a, 110b, 310a, 310b, and when there is a change of mobility node 105a, 105b, 305a, 305b and no change of first gateway 110a, 110b, 310a, 310b.

The subscriber server 128, 308 may further comprise a memory 1013 comprising one or more memory units. The memory 1013 is arranged to be used to store data, received data streams, power level measurements, UE context information, mobility node information, updated UE context information, information indicating change of mobility node and first gateway, information indicating tunnels, messages, request messages, response messages, information indicating whether a mobility node is stateful or stateless, information indicating whether the movement of the UE 101 is due to a RAU or a TAU, threshold values, time periods, configurations, schedulings, and applications etc. to perform the methods herein when being executed in the subscriber server 128, 308. The memory 1013 comprises instructions executable by the processor 1003.

Those skilled in the art will also appreciate that the obtaining module 1001, the receiving module 1005, the transmitting module 1008 and the determining module 1010 described above may refer to a combination of analog and digital circuits, and/or one or more processors configured with software and/or firmware, e.g. stored in a memory, that when executed by the one or more processors such as the processor 1003 perform as described above. One or more of these processors, as well as the other digital hardware, may be included in a single ASIC, or several processors and various digital hardware may be distributed among several separate components, whether individually packaged or assembled into a SoC.

In some embodiments, a second computer program may comprise instructions which, when executed on at least one processor, cause the at least one processor to carry out the method steps in FIGS. 4, 5, 6 and 9 performed by the subscriber server 128, 308. A second carrier may comprise the second computer program, and the second carrier is one of an electronic signal, optical signal, radio signal or computer readable storage medium.

The present mechanism for handling a UE 101 which has moved from an old location to a new location may be implemented through one or more processors, such as a processor 802 in the mobility node arrangement depicted in FIG. 8 and a processor 1003 in the subscriber server arrangement depicted in FIG. 10, together with computer program code for performing the functions of the embodiments herein. The processor may be for example a Digital Signal Processor (DSP), ASIC processor, Field-programmable gate array (FPGA) processor or micro processor. The program code mentioned above may also be provided as a computer program product, for instance in the form of a data carrier carrying computer program code for performing the embodiments herein when being loaded into at least one of the mobility node 105a, 105b, 305a, 305b and the subscriber server 128, 308. One such carrier may be in the form of a CD ROM disc. It is however feasible with other data carriers such as a memory stick. The computer program code can furthermore be provided as pure program code on a server and downloaded to at least one of the mobility node 105a, 105b, 305a, 305b and the subscriber server 128, 308.

In some embodiments, a third computer program may comprise instructions which, when executed on at least one processor, cause the at least one processor to carry out the method steps in FIGS. 4, 5, 6, 7 and 9 performed by the communication system 300. A third carrier may comprise the third computer program, and the second carrier is one of an electronic signal, optical signal, radio signal or computer readable storage medium.

Note that it may be possible to apply the embodiments herein both to the vEPC and to the EPC.

The embodiments herein provides new and optimized mobility procedures that will significantly reduce the signaling needs between core network nodes due to the possibility to take advantage of a stateless nodes sharing an external database.

The embodiments herein use the statelessness of the control logic of the mobility node 305 and the first gateway 310, and the stateful UE context information database shared by the mobility node 305 and the first gateway 310. A cleanup of old nodes (e.g. first gateway User Plane (UP) bearer context information) may be done by another method e.g. a timer based approach. In the old mobility node 305a, there is no need for clean-up since the old mobility node 305a is stateless and it is therefore nothing to clean-up. In the old first gateway 310a, there is no need to clean up the CP since it is stateless. In the old first gateway 310a, the UP needs to be cleaned up (e.g. TEIDs are held in a memory in the UP). But there is no urgency in cleaning up the UP in the first gateway 310 and another method besides signaling over the S11 interface could be used, e.g. a timer based clean-up. The embodiments herein are associated with the mobility aspects. User Location Information (ULI), Presence Reporting Area (PRA) reporting etc., are not considered with the embodiments herein.

In addition to the actual savings in number of messages, there may be additional advantageous issues with the embodiments herein. The mobility procedure (e.g. a TAU procedure) as such is not very frequent compared to e.g. Service Request or other procedures. The mobility procedure by itself may not drive changes to the architecture of the communications system, but if architectural changes, such as stateless and external database, are deployed for other reasons, the mobility procedure such as a TAU procedure may be mandatory and changes may be made to it.

The database 315 comprises UE context information for each registered UE 101. In the UE context information for the UE 101, there is an address for the mobility node which currently serves the UE 101. The address for the mobility node 305 may be referred to as mobility node information, location information, mobility node address, mobility node context etc. When the UE 101 moves to a new location and a new mobility node 305b takes over the responsibility for serving the UE 101, the database 315 needs to be updated with the new mobility node address in the UE context information. In such case, the mobility node information in the UE context information is updated with the new mobility node information.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method for handling a user equipment (UE) which has moved from a first location to a second location, the method comprising:
   a first mobility node receiving a message indicating that the UE has moved from the first location to the second location, wherein the message originated from a base station;
   after receiving the message indicating that the UE has moved from the first location to the second location, the first mobility node sending toward a common database a request for UE context information stored in the common database;
   after sending the request for the UE context information stored in the common database, the first mobility node receiving a response to the request, wherein the response to the request was transmitted by the common database and the response comprises the requested UE context information and the requested UE context information comprises first mobility node information identifying the first mobility node or a second mobility node, wherein the common database is neither a Mobility Management Node (MME) nor a Serving GPRS Support Node (SGSN) and is not a component of either a MME or a SGSN;
   the first mobility node determining whether the first mobility node information included in the UE context information obtained from the common database identifies the first mobility node; and
   as a result of the first mobility node determining that the first mobility node information included in the UE context information does not identify the first mobility node, the first mobility node transmitting updated UE context information comprising second mobility node information identifying the first mobility node.

2. The method according to claim 1, further comprising:
   the first mobility node selecting a serving gateway for serving the UE;
   the first mobility node determining whether the selected serving gateway is a different serving gateway than a serving gateway that was serving the UE when the UE was in the first location; and
   as a result of determining that the selected serving gateway is a different serving gateway than the serving gateway that was serving the UE, the first mobility node initiating a setup of a tunnel between the selected serving gateway and another gateway.

3. The method according to claim 1, wherein transmitting the updated UE context information as a result of the first mobility node determining that the mobility node information does not identify the first mobility node comprises
   the first mobility node transmitting a location message to a Home Subscriber Server (HSS) as a result of the first mobility node determining that the mobility node information does not identify the first mobility node, the location message comprising the updated UE context information.

4. The method according to claim 3, wherein the common database is not the HSS and is not a component of the HSS.

5. The method according to claim 1, wherein
the updated UE context information further comprises i) state information indicating that the first mobility node is stateless or ii) state information indicating that the first mobility node is stateful, and
the first mobility node is stateless if there is no need to update the first mobility node during a subsequent mobility procedure with respect to the UE.

6. The method according to claim 1, wherein initiating a setup of the tunnel between the selected serving gateway and another gateway comprises transmitting a Create Session Request message to the selected serving gateway.

7. The method according to claim 1, wherein transmitting the updated UE context information comprises:
transmitting the updated UE context information to the common database, and
transmitting to a subscriber server an Update Location message comprising the updated UE context information.

8. The method according to claim 1, further comprising receiving a location update message transmitted by the UE, wherein the first mobility node obtains the UE context information from the database in response to receiving the location update message, wherein
the common database is not a Home Subscriber Server (HSS), and
the common database is not a component of an HSS.

9. The method according to claim 8, wherein the location update message is one of: a Tracking Area Update or a Routing Area Update.

10. The method according to claim 1, wherein the first mobility node is a Mobility Management Entity or a virtualized Mobility Management Entity.

11. A computer program product comprising a non-transitory computer readable medium comprising a computer program comprising instructions which, when executed on at least one processor, cause the at least one processor to carry out the method according to claim 1.

12. A method for handling a user equipment (UE), the method comprising:
storing, by a subscriber server, first UE context information for the UE, the first UE context information for the UE comprising first mobility node information comprising a first mobility node identifier identifying a first mobility node;
after storing the first UE context information, the subscriber server receiving second UE context information for the UE, wherein the second UE context information was transmitted by a second mobility node and comprises second mobility node information comprising a second mobility node identifier identifying the second mobility node;
in response to receiving the second UE context information transmitted by the second mobility node, the subscriber server retrieving the stored UE context information comprising the first mobility node information; and
the subscriber server determining whether to transmit a cancel location message to the first mobility node based on the retrieved UE context information, wherein the step of determining whether to transmit a cancel location message to the first mobility node based on the retrieved UE context information comprises:
the subscriber server determining whether the retrieved UE context information indicates that the first mobility node is stateless; and
the subscriber server deciding to refrain from transmitting the cancel location message to the first mobility node as a result of the subscriber server determining that the retrieved UE context information indicates that the first mobility node is stateless, wherein the first mobility node is stateless if there is no need to update the first mobility node during a subsequent mobility procedure with respect to the UE.

13. The method according to claim 12, wherein
receiving the second UE context information comprises:
receiving an Update Location message from the second mobility node, wherein the Update Location message comprises the second UE context information comprising the second mobility node information comprising the second mobility node identifier identifying the second mobility node; and
the method further comprises the subscriber server transmitting an Update Location Acknowledgement message to the second mobility to acknowledge the receipt of the Update Location message.

14. The method according to claim 12, wherein
the second UE context information further comprises state information indicating whether the second mobility node is stateless or stateful, and
the second mobility node is stateless if there is no need to update the second mobility node during a mobility procedure.

15. The method according to claim 12, wherein the subscriber server is a Home Subscriber Server (HSS), a virtualized HSS, a Home Location Register (HLR), or a virtualized HLR.

16. The method according to claim 12, wherein
at least one of the first mobility node or the second mobility node is stateless, and
a mobility node is stateless if there is no need to update the mobility node during a mobility procedure.

17. The method according to claim 12, wherein the second mobility node transmits the second UE context information as a result of i) the UE performing one of a Tracking Area Update (TAU) or a Routing Area Update (RAU) and ii) the second mobility node determining that the first mobility node was serving the UE prior to the UE performing the TAU or RAU.

18. A computer program product comprising a non-transitory computer readable medium comprising a computer program comprising instructions which, when executed on at least one processor, cause the at least one processor to carry out the method according to claim 12.

19. A first mobility node for handling a user equipment (UE) which has moved from a first location to a second location, the first mobility node being adapted to:
send toward a common database a request for UE context information stored in the common database;
after sending the request for the UE context information stored in the common database, receive a response to the request, wherein the response to the request was transmitted by the common database and the response comprises the requested UE context information and the requested UE context information comprises first mobility node information identifying the first mobility node or a second mobility node, wherein the common database is neither a Mobility Management Node (MME) nor a Serving GPRS Support Node (SGSN) and is not a component of either a MME or a SGSN;

determine whether the first mobility node information included in the UE context information obtained from the common database identifies the first mobility node; and as a result of determining that the first mobility node information does not identify the first mobility node, transmit updated UE context information comprising second mobility node information identifying the first mobility node.

20. The first mobility node according to claim 19, being further adapted to:
select a serving gateway for serving the UE;
determine whether the selected serving gateway is a different serving gateway than a serving gateway that was serving the UE when the UE was in the first location; and
as a result of determining that the selected serving gateway is a different serving gateway than the serving gateway that was serving the UE, initiate a setup of a tunnel between the selected serving gateway and another gateway.

21. The first mobility node according to claim 19, wherein mobility node is configured to transmit the updated UE context information to at least one:
the common database, and
a subscriber server.

22. The first mobility node according to claim 19, wherein the updated UE context information further comprises i) state information indicating that the first mobility node is stateless or ii) state information indicating that the first mobility node is stateful, and
the first mobility node is stateless if there is no need to update the first mobility node during a subsequent mobility procedure with respect to the UE.

23. The first mobility node according to claim 19, wherein initiating a setup of the tunnel between the selected serving gateway and another gateway comprises transmitting a Create Session Request message to the selected serving gateway.

24. The first mobility node according to claim 19, wherein the first mobility node is configured to transmit the updated UE context information to both the common database and a subscriber server.

25. The first mobility node according to claim 19, wherein the first mobility node is configured to retrieve the UE context information from the common database in response to receiving a location update message transmitted by the UE.

26. The first mobility node according to claim 25, wherein the location update message is one of: a Tracking Area Update or a Routing Area Update.

27. The first mobility node according to claim 19, wherein at least one of the first mobility node or the second mobility node is stateless, and
a mobility node is stateless if there is no need to update the mobility node during a mobility procedure.

28. The first mobility node according to claim 19, wherein the mobility node is a Mobility Management Entity or a virtualized Mobility Management Entity.

29. A subscriber server for handling a user equipment (UE) which has moved from an old location to a new location, the subscriber server being adapted to:
store first UE context information for the UE, the first UE context information for the UE comprising first mobility node information comprising a first mobility node identifier identifying a first mobility node;
retrieve the UE context information comprising the first mobility node information after receiving second UE context information for the UE transmitted by a second mobility node; and
determine whether to transmit a cancel location message to the first mobility node based on the retrieved UE context information, wherein
the subscriber server is configured to determine whether to transmit the cancel location message to the first mobility node based on the retrieved UE context information by performing a process comprising:
determining whether the retrieved UE context information indicates that the first mobility node is stateless; and
deciding to refrain from transmitting the cancel location message to the first mobility node as a result of determining that the retrieved UE context information indicates that the first mobility node is stateless, wherein the first mobility node is stateless if there is no need to update the first mobility node during a subsequent mobility procedure with respect to the UE.

30. The subscriber server according to claim 29, being further adapted to:
receive an Update Location message from the second mobility node, wherein the Update Location message comprises the second UE context information; and
transmit an Update Location Acknowledgement message to the second mobility to acknowledge the receipt of the Update Location message.

31. The subscriber server according to claim 29, wherein the second UE context information comprises i) state information indicating that the second mobility node is stateless or ii) state information indicating that the first mobility node is stateful, and
the second mobility node is stateless if there is no need to update the second mobility node during a mobility procedure.

32. The subscriber server according to claim 29, wherein the subscriber server is a Home Subscriber Server (HSS), a virtualized HSS, a Home Location Register (HLR), or a virtualized HLR.

33. The subscriber server according to claim 29, wherein at least one of the first mobility node or the second mobility node is stateless, and
a mobility node is stateless if there is no need to update the mobility node during a mobility procedure.

34. The subscriber server according to claim 29, wherein the second mobility node transmits the second UE context information as a result of i) the UE performing one of a Tracking Area Update (TAU) or a Routing Area Update (RAU) and ii) the second mobility node determining that the first mobility node was serving the UE prior to the UE performing the TAU or RAU.

35. A method for handling a user equipment (UE), the method comprising:
a first mobility node sending toward a common database a request for UE context information stored in the common database;
after sending the request for the UE context information stored in the common database, the first mobility node receiving a response to the request, wherein the response to the request was transmitted by the common database and the response comprises the requested UE context information, and a gateway was serving the UE before the UE context information was received, the UE context information comprising first mobility node information identifying the first mobility node or another mobility node;

the first mobility node determining whether the first mobility node information included in the UE context information obtained from the common database identifies the first mobility node;

the first mobility node selecting a gateway to serve the UE;

the first mobility node determining whether the selected gateway is a different gateway than the gateway that was serving the UE before the UE context information was retrieved; and as a result of selecting the gateway to serve the UE and determining that the selected gateway is a different gateway than the gateway that was serving the UE before the UE context information was obtained, the first mobility node initiating the set-up of a tunnel between the selected gateway and another gateway, wherein the common database is neither a Mobility Management Node (MME) nor a Serving GPRS Support Node (SGSN) and is not a component of either a MME or a SGSN.

36. A computer program product comprising a non-transitory computer readable medium comprising a computer program comprising instructions which, when executed on at least one processor, cause the at least one processor to carry out the method according to claim 35.

37. A first mobility node, the first mobility node being adapted to:

receive a message indicating that a user equipment (UE) has moved to a new location;

after receiving the message indicating that the UE has moved to the new location, send toward a common database a request for UE context information stored in the common database;

after sending the request for the UE context information stored in the common database, receive a response to the request, wherein the response to the request was transmitted by the common database and the response comprises the requested UE context information, and a gateway was serving the UE before the message was received, the UE context information comprising first mobility node information identifying the first mobility node or a second mobility node;

determine whether the first mobility node information included in the UE context information obtained from the common database identifies the first mobility node;

select a gateway to serve the UE;

determine whether the selected gateway is a different gateway than the gateway that was serving the UE before the UE context information was obtained; and as a result of selecting the gateway to serve the UE and determining that the selected gateway is a different gateway than the gateway that was serving the UE before the UE context information was obtained, initiate the set-up of a tunnel between the selected gateway and another gateway, wherein the common database is neither a Mobility Management Node (MME) nor a Serving GPRS Support Node (SGSN) and is not a component of either a MME or a SGSN.

* * * * *